US006972757B2

(12) United States Patent
Arikawa et al.

(10) Patent No.: US 6,972,757 B2
(45) Date of Patent: Dec. 6, 2005

(54) PSEUDO 3-D SPACE REPRESENTATION SYSTEM, PSEUDO 3-D SPACE CONSTRUCTING SYSTEM, GAME SYSTEM AND ELECTRONIC MAP PROVIDING SYSTEM

(75) Inventors: Masatoshi Arikawa, Tokyo (JP); Hiroya Tanaka, Tokyo (JP); Ryosuke Shibasaki, Tokyo (JP)

(73) Assignee: President of the University of Tokyo, Tokyo (JP)

( * ) Notice: Subject to any disclaimer, the term of this patent is extended or adjusted under 35 U.S.C. 154(b) by 330 days.

(21) Appl. No.: 10/037,229

(22) Filed: Jan. 3, 2002

(65) Prior Publication Data

US 2002/0187831 A1  Dec. 12, 2002

(30) Foreign Application Priority Data

Jun. 8, 2001  (JP) .............................. 2001-174582

(51) Int. Cl.[7] ........................................... G06T 15/00

(52) U.S. Cl. ..................... 345/419; 345/427; 345/473; 715/757; 715/850

(58) Field of Search ............................... 345/419, 630, 345/634, 635, 637, 639, 640, 641, 427, 473, 345/619, 629; 463/32; 715/757, 850

(56) References Cited

U.S. PATENT DOCUMENTS

| | | | | |
|---|---|---|---|---|
| 5,493,677 A | * | 2/1996 | Balogh et al. | ............ 707/104.1 |
| 5,706,417 A | * | 1/1998 | Adelson | ...................... 345/640 |
| 6,434,265 B1 | * | 8/2002 | Xiong et al. | ................. 382/154 |

FOREIGN PATENT DOCUMENTS

| | | |
|---|---|---|
| JP | 5-307356 | 11/1993 |
| JP | 6348815 | 12/1994 |
| JP | 7-95467 | 4/1995 |
| JP | 8-36355 | 2/1996 |
| JP | 9-97344 | 4/1997 |
| JP | 9-288445 | 11/1997 |
| JP | 10-154222 | 6/1998 |
| JP | 11-17924 | 1/1999 |
| JP | 11-88731 | 3/1999 |
| JP | 11-112790 | 4/1999 |
| JP | 11-184375 | 7/1999 |
| JP | 11-213141 | 8/1999 |

(Continued)

OTHER PUBLICATIONS

Hiroya Tanaka, "Spatiotemporal BBS System for Supporting Local Community", Mar. 8-10, 2001, The 12th Data Engineering Workshop (DEW2001) DEWS01-7B-7.

(Continued)

*Primary Examiner*—Kee M. Tung
*Assistant Examiner*—Enrique L. Santiago
(74) *Attorney, Agent, or Firm*—Jordan and Hamburg LLP

(57) ABSTRACT

Disclosed is a pseudo 3-D space representation system capable of creating a cubic pseudo 3-D space with a plurality of 2-D images by simple operation. An operation display means displays plural images to a user who is requested to specify a same area on each of two or more images by using an area specifying means. A specified area associating means associates the specified area on one image with the specified area on the other image as one set or plural sets of common parts. An image transforming means transforms one or both images by matching the specified areas by affine transformation and an image display means displays both images as superposed on one the other.

51 Claims, 11 Drawing Sheets

FOREIGN PATENT DOCUMENTS

| | | |
|---|---|---|
| JP | 11328443 | 11/1999 |
| JP | 2000-99693 | 4/2000 |
| JP | 2000-228748 | 8/2000 |
| JP | 2001-52146 | 2/2001 |

OTHER PUBLICATIONS

Hiroya Tanaka, Masatoshi Arikawa, Ryosuke Shibasaki, "Common Sharing of Local Community Information by Using Spatio-Temporal BB System", May 2001, Proceedings of The Symposium on Information Systems for Functional Figures, vol. 12, 2001.

Hiroya Tanaka, Masatoshi Arikawa, Ryosuke Shibasaki, "Extensive Pseudo 3-D Spaces with Overlaid Multiple Photographs", Dec. 5-7, 2001, The 9th Workshop on Interactive Systems and Software (WISS 2001).

Hiroya Tanaka, Masatoshi Arikawa, Ryosuke Shibasaki, "A Representation of Pseudo-3D Architectural Spaces with Photographs", Sep. 22-24, 2001, Abstracts of the Conference of the Architectural Institute of Japan, pp. 941-942.

Hiroya Tanaka (TEXT), "Navigation in Architectural Spatio-Temporal Scenes, Explanation of Multi-Dimensional Photo-Collage", Aug. 2001, Kenchiku bunka, vol. 56, No. 654.

Hiroya Tanaka (TEXT), "Navigation in Architectural Spatio-Temporal Scenes, Multi-Dimensional Photo-Collage", Oct. 2001, Kenchiku bunka, vol. 56, No. 655.

Hiroya Tanaka (TEXT), "Navigation in Architectural Spatio-Temporal Scenes, Multi-Dimensional Photo-Collage", Dec. 2001, Kenchiku bunka, vol. 56, No. 656.

Hiroya Tanaka, "Navigation in Architectural Spatio-Temporal Scenes, Multi-Dimensional Photo-Collage", Feb. 2002, Kenchiku bunka, vol. 57, No. 657.

Hiroya Tanaka, Masatoshi Arikawa, Ryosuke Shibasaki, "A 3-D Photo Collage System for Spatial Navigations", Oct. 19-20, 2001, Workshops (Digital Cities: Experiences, Technologies and Future Perspectives, Lecture Notes in Computer Science), Kyoto Research Park.

Hiroya Tanaka, Masatoshi Arikawa, Ryosuke Shibazaki, "Public Pseudo-3D Spaces with Association of Photographs on the Web", Jun. 20-22, 2001, Symposium on ASIA GIS 2001, Tokyo Big Site, Sponsored by CSIS, in electronic proceedings.

Hiroya Tanaka (TEXT), "How is the WEB world seen from the sky?", Sep. 2001, Agost Design Graphics, vol. 011.

International Publication No. WO96/19780 (Priority Data: US08/362118, US08/383198, US08/482016).

M. Tsukamoto, "Image-based Pseudo-3D Visualization of Real Space on WWW", Digital Cities: Technologies, Experiences, and Future Perspectives, Lecture Notes in Computer Science, Springer-Verlag, vol. 1765, pp. 288-302, 2000.

T. Ogawa and M. Tsukamoto, "Tools for Constructing Pseudo-3D Space on the WWW Using Images", New Generation Computing, vol. 18, No. 4, pp. 391-407, 2000.

Y. Horry, K. Anjyo and K. Arai, "Tour Into the Picture: Using a Spidery Mesh Interface to Make Animation from a Single Image", In SIGGRAPH '97 Proceedings, pp. 225-232. 1997.

N.Li and Z.Huang, "Tour Into The Picture Revisited", The 9-th International Conference in Central Europe on Computer Graphics, Visualization and Computer Vision (WSCG), 2001 http://wscg.zcu.cz/wscg2001/WSCG2001_Program.htm.

* cited by examiner

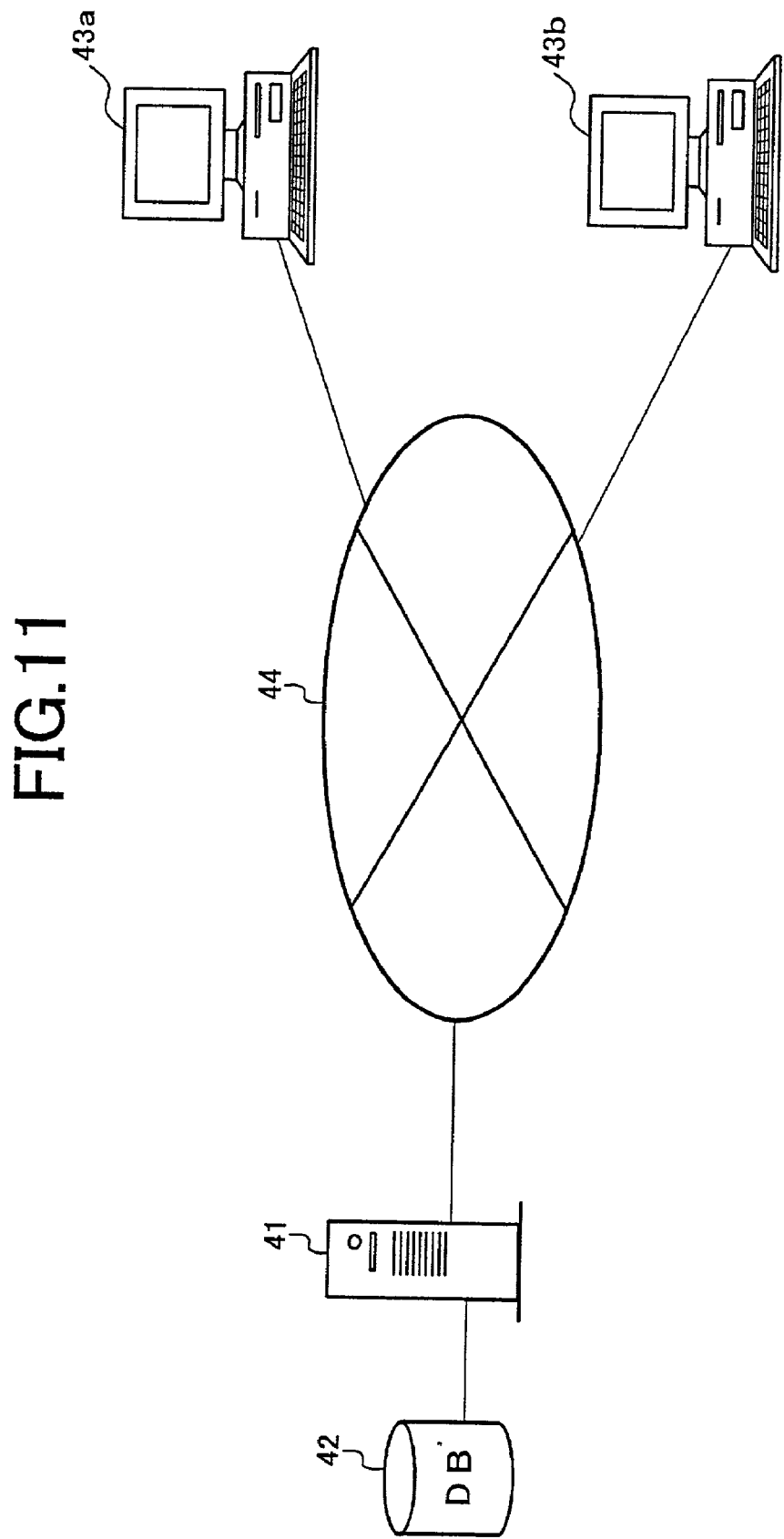

PSEUDO 3-D SPACE REPRESENTATION SYSTEM, PSEUDO 3-D SPACE CONSTRUCTING SYSTEM, GAME SYSTEM AND ELECTRONIC MAP PROVIDING SYSTEM

BACKGROUND OF THE INVENTION

The present invention relates to a pseudo three-dimensional (3-D) space representation system, a pseudo 3-D space constructing system, a game system, an electronic map display system, an electronic map providing system and a navigation system as well as methods and application programs for realizing the above systems and recording media. More specifically, the present invention relates to a pseudo 3-D representation system for representing pseudo three-dimensional spaces by using a plurality of two-dimensional images, a system for constructing pseudo 3-D spaces, a game system, an electronic map display system, a navigation system as well as methods and programs for the above systems and recording media.

The present invention can be applied for example as systems and algorithms for representing pseudo 3-D spaces on a computer screen to process images and/or realize visual interfaces in the field of information technology and also applied as network systems in the field of the information technology. In addition to the above, the application fields of the present invention are extended to architectural engineering, civil engineering, cognition science, geography and so on.

Recently, a large number of spatial contents including spatial keys such as a place and a location have been provided on the Web (WWW). These spatial contents allow users to plan a schedule, recognize appointed places and acquire information about a present location and environments anytime and anywhere by using a portable telephone set and a portable terminal. Propagation of spatial contents enables people to create new activities and communications. In this connection, it is keenly expected to provide further enriched spatial contents on the Web.

However, most of spatial contents currently available on the Web relate to objective and public information by specific providers, government agencies and educational facilities (universities), which have temporal and operational limitation of one-way information system. It is necessary to build up technical, regime and social foundations enabling ordinary people to actively transmit information. Realizing the circulation of transmit-receive spatial information may serve as one of the bases of the next generation of information society. In other words, it is necessary to create environments allowing ordinary people to actively create and publish subjective and private spatial contents including own remembrance, thought and comments on own spatial experience and places.

Subjective and private information used in this specification means personal remembrance, emotion and opinion with spatial keys such as places or locations, say, for example, "Flowers like those were out here in the past", "this way is my favorite" and "I think this space shall be thus improved".

A photographic image is considered as one of the most convenient existing media for experiencing the above-described spaces. A photographic image produced from a still picture taken by a still photographic camera by digitizing through an image reading device such as a scanner or a photographic image taken by a digital camera is a convenient medium allowing ordinary people to record a spatial experience in the real world but it may be used merely as a static two-dimensional image that is poor in attractiveness and reusability. However, photographic images can provided with additional metadata such as information about a name of a place, direction, date, title, message, photographer's name and so on. Therefore, photos are simple and useful media for transmitting non-literal information such as an atmosphere on site and movement.

Recent propagation of compact, portable or incorporated digital cameras increases circulation and reuse of photographic images on the Web network. Nevertheless, in many cases, the photographic images have been used merely as static and fragmental two-dimensional images. Specially, the use of photographic images as independent scenes cannot represent spatial extension or spatial movement and therefore cannot create attractive spatial contents.

The way of representing a pseudo 3-D space on a display screen of a computer is a geometrical approach (VRML) based on 3-D geometric data and a cognition approach based on association with a human's 2-D retinal image. The former is a geometry-based 3-D spatial format such as VRML, OpenGL, DirectX, DXF and so on. The 3-D spatial representation for computer graphics is realized by constructing a pseudo 3-D coordinate system for computation. The latter is specifically called "Image-based Modeling/Rendering" method, which is intended to create a more impressive spatial representation with real world ambience by using photos of real spaces. In comparison with the former method, this method for creating pseudo 3-D spaces by using spatial photographs taken in the real world can produce the spatial representation more easily and quickly. Namely, this approach offers advantages: it can easily create a more realistic spatial representation for a shorter time.

There are some "Image-based Rendering" approaches for creating pseudo 3-D spaces. Among them, QuickTime-VR format produced by Apple Company has been most widely used in the world for publishing photo-based pseudo 3-D spaces with particularly a 360-degree panoramic representation composed of a plurality of photos merged with one another. The panoramic image enables users to experience a pseudo 3-D space by using two kinds of functions "Rotating" and "Zooming-in/out". This format is used mainly in USA with a highest share and widely utilized in Japan.

However, QuickTime-VR is difficult for many users to use it due to the need of preparing an original panoramic representation, converting data into a specific format by using a specific application software and conducting some complex operations. Regarding the spatial representation, it is impossible to move the image in horizontal directions and turn the image in vertical directions. Furthermore, the spatial product created by one user is fixed and it does not allow any other person to participate in refining and extending its contents on networks.

Except for the QuickTime-VR, there are available other formats such as LumiGraph, Light Field and so on to realize the Image-Based Rendering, which enable more precise pseudo 3-D spatial representation but have not been spread because of the need of predetermining the movement of a camera (i.e., the need of using a very specific camera).

SUMMARY OF THE INVENTION

Accordingly, a primary object of the present invention is to provide a pseudo 3-D space representation system, a pseudo 3-D space construction system, a game system, an electronic map display system, an electronic map providing system and a navigation system, which are capable of creating pseudo 3-D spaces with a plurality of photographs taken, for example, by a not-professional but conventional camera and by simple operation and, which are capable of representing all kinds of movements and actions, and which are capable of publishing, circulating, creating and providing pseudo 3-D spaces on networks, and to provide methods of realizing the above systems, programs necessary for causing computers to function as the above respective systems and computer readable recording media with the programs recorded thereon.

Another object of the present invention is to provide a pseudo 3-D space representation system, a pseudo 3-D space construction system, game system, electronic map display system, an electronic map providing system and a navigation system, which are capable of constructing a pseudo 3-D space with photos with restricted visual fields and by applying photos taken past and/or unintentionally prepared images, and methods for the above systems, programs for causing computers to function as the above respective systems and computer readable recording media with the programs recorded thereon.

The present invention achieves the above-described objects by using the following technical means:

The first technical means is a pseudo 3-D space representation system for representing a pseudo 3-D space with a plurality of 2-D images, comprising: a specified area associating means for associating one or more sets of areas specified on one image and the other image or images as common parts; an image transforming means for transforming one or both images through affine transformation by matching the corresponding areas specified on the images; and an image display means for displaying both images as superposed on each other.

The second technical means is a pseudo 3-D space representation system as described in the first technical means, which further comprises an operation image display means for displaying a plurality of images and an area specifying means for allowing a user to specify areas on each of two or more images displayed to the user.

The third technical means is a pseudo 3-D space representation system for representing a pseudo 3-D space with a plurality of 2-D images, comprising: a specified area transforming means for transforming an area specified on an image through affine transformation; a specified area retrieving means for retrieving a part common with the specified area from plural images; an image transforming means for transforming one or both images through affine transformation in such a way that the specified area and the retrieved area may matched with each other; and an image display means for displaying both images superposed on each other.

The fourth technical means is a pseudo 3-D space representation system as described in the third technical means, which further comprises an operation image display means for displaying an image and an area specifying means for specifying an area on the displayed image.

The fifth technical means is a pseudo 3-D space representation system as described in any one of the first to the fourth technical means, which further comprises a transparency specifying means for specifying transparency for one image respective to the other image and wherein the image display means displays the images according to the specified transparency of the image.

The sixth technical means is a pseudo 3-D space representation system as described in any one of the first to the fifth technical means, wherein the image is provided with metadata and the image display means is provided with a metadata display means for displaying metadata added to the image when user selects the image.

The seventh technical means is a pseudo 3-D space representation system as described in any one of the first to the sixth technical means, wherein the image transforming means has a means for transforming image shape in order that the selected image or the specified image of the both images superposed each other by the image display means is transformed to the original shape, the image shape being the shape of the other image of the both images or the both images, and the image display means has an image presenting means for presenting selectable images other than the original one and a display image changing means for changing the displayed images by displaying both images transformed by the image transforming means.

The eighth technical means is a pseudo 3-D space representation system as described in any one of the first to the seventh technical means, wherein the image display means has an area presenting means for selectively presenting an area on an image associated with an area on another image and a display image changing means for changing display image by displaying the associated original image of the another image when the area presented by the area presenting means is selected.

The ninth technical means is a pseudo 3-D space representation system as described in the seventh or eighth technical means, wherein the image transforming means has an interpolation image generating means for generating a series of interpolating images by affine transformation until a next original image is displayed and the display image changing means has an interpolation image display means for subsequently displaying the interpolation images generated by the interpolation image generating means.

The tenth technical means is a pseudo 3-D space representation system as described in the ninth technical means, which further comprises a traversing time changing means for changing a traversing time necessary for changing display image from an unchanged image to an original image to represent a pseudo temporal distance according to a difference between the unchanged image and the original image.

The eleventh technical means is a pseudo 3-D space representation system as described in the ninth or tenth technical means, wherein each image is provided with metadata including at least time information and a calculation means is provided for calculating a time necessary for changing to display from an original image of one image to the another and the changing is completed within the calculated time.

The twelfth technical means is a pseudo 3-D space representation system as described in any one of the ninth to the eleventh technical means, wherein each image is provided with metadata including at least information about a position and a direction thereof, a calculation means is provided for calculating relative positions for each of two images according to the metadata and changing to display from an original image of one image to the another is completed according to the specified relationship between two positions.

The thirteenth technical means is a pseudo 3-D space representation system as described in any one of the first to the twelfth technical means, wherein the image display means displays specified two or more images in succession in the specified order.

The fourteenth technical means is a pseudo 3-D space representation system as described in any one of the first to the thirteenth technical means, wherein an image is provided with metadata including at least information about a position and a direction thereof and there is provided a means for identifying a position of the image based on the each metadata and associating the metadata with the electronic map and a means for displaying the image identified by the metadata on the electronic map.

The fifteenth technical means is a pseudo 3-D space representation system as described in any one of the first to the fourteenth technical means and connected to a number of client devices through a network, wherein the server device has an image database storing a plurality of images, provides function of the pseudo 3-D space representation system to the client devices through the network, receives from the client device an image associated with a specified area of an image stored in the database by using the pseudo 3-D space representation system and stores said image into the database.

The sixteenth technical means is a game system for playing a game for specifying an area on an image by using the pseudo 3-D space representation system as described in any one of the first to the fourteenth technical means, further specifying an area of another image associated with the specified area and repeating the same until all specified images are linked, which has an image database storing a plurality of image groups each composed of a plurality of images associated with each other in such a way that areas of images can be linked only in a specified order and which presents a group of images for users to specify areas one on each of two images, links two specified areas, adds points of the links and presents remaining images of the group excepting two images which areas were specified and repeats the same steps.

The seventeenth technical means is an electronic map display system, wherein a pseudo 3-D space representation images created by using the pseudo 3-D space representation system as described in any one of the first to the fourteenth technical means is embedded in a corresponding position on an electronic map or liked thereto and displayed thereon.

The eighteenth technical means is an electronic map providing system equipped with a server device having an electronic map database containing a pseudo 3-D spatial electronic map prepared by embedding in corresponding positions thereof or linked thereto a pseudo 3-D space representation images created by using a pseudo 3-D space representation system as described in any one of the first to the fourteenth technical means, wherein the server device connected to a number of client devices through a network retrieves the pseudo 3-D special electronic map in the electronic map database in response to access from the client device and provides it to the client device.

The nineteenth technical means is a navigation system equipped with a server device including an electronic map database containing a pseudo 3-D spatial electronic map prepared by embedding in corresponding positions thereon or linked thereto a pseudo 3-D space representation image created by using a pseudo 3-D space representation system as described in any one of the first to the fourteenth technical means, wherein the server device is connected to a number of client devices capable of detecting its present position through network and, in response to an access from any client device indicating its current position, it retrieves in the electronic map database and provides the client device with pseudo 3-D spatial electronic map corresponding to the current position, thus navigating the user of the client device.

The twentieth technical means is a navigation system including an electronic map database containing a pseudo 3-D spatial electronic map prepared by embedding in corresponding positions thereon or linked thereto a pseudo 3-D space representation image created by using a pseudo 3-D space representation system as described in any one of the first to the fourteenth technical means, which navigates a user by detecting a current position, searching an electronic map corresponding to the detected current position in the electronic database and displaying the pseudo 3-D spatial electronic map on a display screen of the user device.

The twenty-first technical means is a pseudo 3-D space representing method for creating a pseudo 3-D spatial representation by executing steps of displaying a plurality of images to a user, causing the user to specify areas on each of two or more images, associating the specified area of one displayed image with the specified area of the other displayed image as common parts, transforming the shape of one or both images through affine transformation by matching the paired areas and superposing both images.

The twenty-second technical means is a pseudo 3-D space representing method for creating a pseudo 3-D spatial representation through steps of displaying an image to a user, causing the user to specify an area on the displayed image, transforming the specified area by affine transformation, retrieving a part common to the specified area from a plurality of images, transforming the shape of one or both images through affine transformation to match the specified area with the area extracted by the retrieval and displaying both images superposed on each other.

The twenty-third technical means is an electronic map displaying method whereby a pseudo 3-D spatial representation image prepared by the pseudo 3-D space representing method as described in the twenty-first or twenty-second technical means is embedded in a corresponding position on an electronic map or linked thereto to display the same representation image on the electronic map.

The twenty-fourth technical means is a navigation method for navigating users by providing through a network a pseudo 3-D spatial electronic map prepared by the pseudo 3-D space representing method as described in the twenty-first or twenty-second technical means and embedded in or linked to corresponding positions on the electronic map.

The twenty-fifth technical means is a program for causing a computer to work as a pseudo 3-D space representation system as described in any one of the first to the fourteenth technical means or as a pseudo 3-D space constructing system as described in the fifteenth technical means or as a game system as described in the sixteenth technical means or as an electronic map display system as described in the seventeenth technical means or as an electronic map providing system as described in the eighteenth technical means or as a navigation system as described in the nineteenth or twentieth technical means.

The twenty-sixth technical means is a computer readable recording medium with a recorded program for causing a computer to work as a pseudo 3-D space representation system as described in any one of the first to the fourteenth technical means or as a pseudo 3-D space constructing system as described in the fifteenth technical means or as a game system as described in the sixteenth technical means or as an electronic map display system as described in the seventeenth technical means or as an electronic map providing system as described in the eighteenth technical means or as a navigation system as described in the nineteenth or twentieth technical means.

BRIEF DESCRIPTION OF THE DRAWINGS

FIG. 11 is a view for explaining a pseudo 3-D space constructing system according to an embodiment of the present invention.

PREFERRED EMBODIMENT OF THE INVENTION

Figure 1:
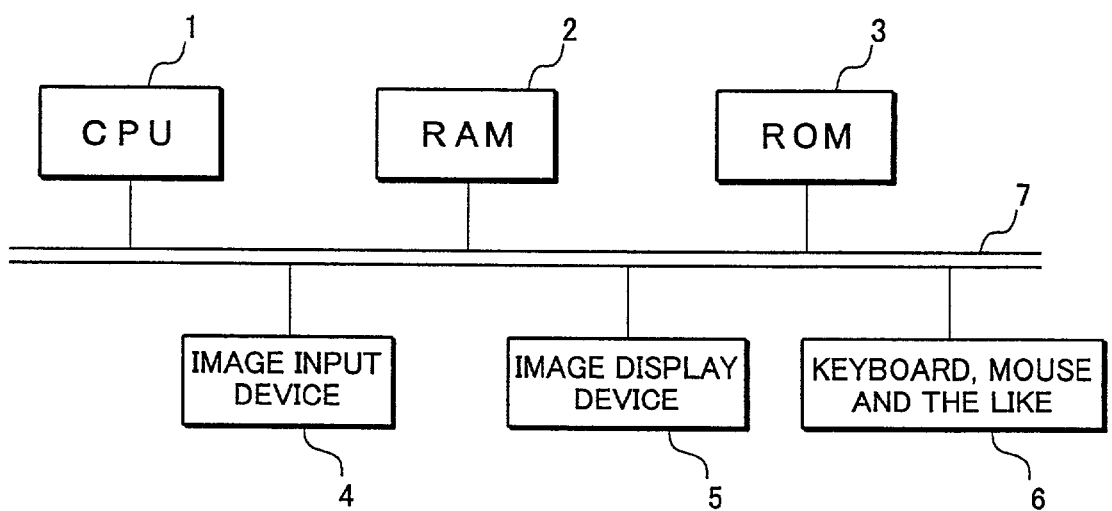
FIG. 1 is a view for explaining a pseudo 3-D space representation system according to the present invention.

FIG. 1 is a view for explaining a pseudo 3-D space representation system according to the present invention.

The pseudo 3-D space representation system embodying the present invention (hereinafter referred to as "the present system") is composed of main technical means to be described later. The present system is intended to create pseudo 3-D spaces with a plurality of 2-D images input spontaneously or previously from an image input device 4 such as a scanner, a digital camera and so on. In addition to photos taken by a still camera, printed pictures, illustration or graphics from printed documents can be also scanned and used in the present system. Furthermore, images acquired directly from the Internet or computer graphics generated directly by a computer may be also used in the present system. A CPU 1, a RAM 2, a ROM 3, an image input device 4, an image display device 5, a keyboard 6 may be connected to each other through a bus 7 or parts of every component may be connected to each other via a network such as a LAN.

Input images are stored temporally in RAM 2 or stored directly as component data of the database in the ROM 3. Programs necessary for functioning a computer as respective technical means to be described later are also stored in the ROM 3. The respective programs may be read by the CPU 1 and executed by respective processing hardware modules as technical means or their combinations. There may be a variety of software programs for technical means, such as, for example, a program for accessing an image database via a user interface for linking images. The states and results in the midway of image processing may be presented to the user through the image display device 5 such as a CRT and so on and processing parameters if necessary may be inputted by the user via the keyboard or the mouse (pointing device) 6. Intermediate data generated in the course of processing to be described later is accumulated in the RAM 2 and read, corrected or rewritten by the CPU 1 as the need be. The pseudo spatial representation created as the result of subsequent operations is read from the RAM 2 and output to the image display device 5.

The present invention can be embodied by software including application program to be loaded into a computer system for realizing the function for representing a pseudo 3-D space or a recording medium with the same program and necessary data recorded thereon. A variety of recording media such as a CD-ROM, optical magnetic disk, DVD-ROM, FD, flash memory, memory stick and various types of ROMs and RAMs. The programs for causing the computer system to perform functions of the systems embodying the present invention (to be described later) can be recorded on the suitable recording media for sale on the market. The program from the recording medium is read by the user' information processing device (e.g., a personal computer) or stored in the memory of the user's information processing device. Thus, the program may be read and executed by the user's device. The functions of the systems according to the present invention can be thus executed by the user's device.

The program may also be disclosed as an open service system on the Internet. Irrespective of the operation system, all users of the Internet have access to the site where he or she can use this application program using a conventional browser. For example, this software is assumed as developed with "LINGO" language by using the Authoring Soft "MacromediaDirector8" of Macromedia Company. In this case, "Shockwave Player" of the same company must be used to run this application program. As the current version of the browser is provided with this as a standard tool, this application may be widely utilized.

This application software can be effectively used since it simply requires the user to draw areas to be superposed on each other.

Figure 2:
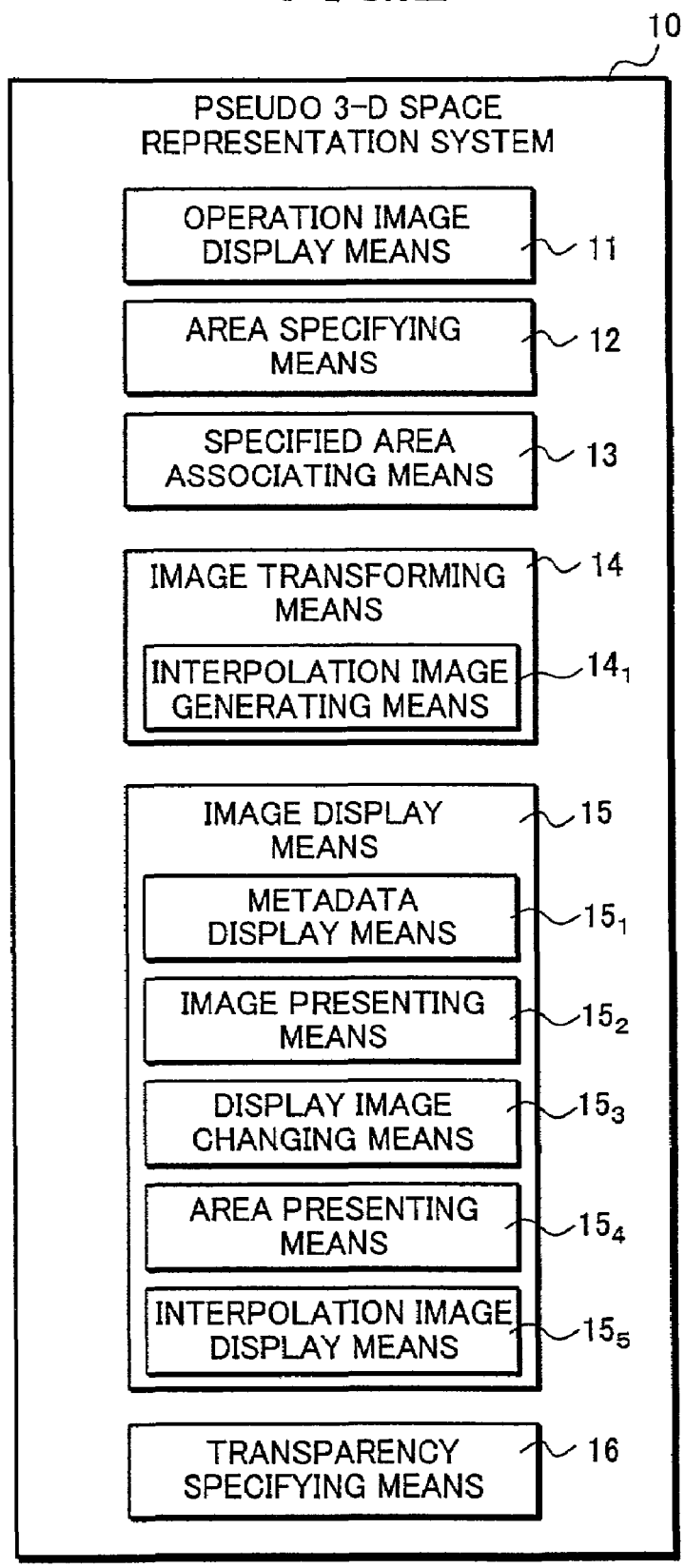
FIG. 2 is a construction view for explaining a pseudo 3-D space representation system related to embodiments of the present invention.

FIG. 2 is a construction block diagram of a pseudo 3-D space representation system embodying the present invention. The pseudo 3-D representation system shown in FIG. 2 will be described with reference to FIGS. 3 to 10 showing exemplary images to be processed by the present system.

As shown in FIG. 2, this embodiment comprises a specified-areas associating means 13, an image transforming means 14 and an image displaying means 15. The specified areas associating means 13 associates an area specified on an image (a specified area) with an area specified on another image (another specified area) as a common part. The specified area may be such that it includes a whole or part of a certain object on an image. For example, for an image showing a front half of a car body on a background, the front half of the car body may be specified thereon or an area enough to contain a whole car body exceeding out of the image on a screen. It is also possible to associate plural sets of the common parts. For example, a certain area on the first image and a certain area on the second image are associated with each other as common parts of the both images and another area or the same area or the second image and an area on the third image are associated with each other as common parts of the both images.

Figure 3:
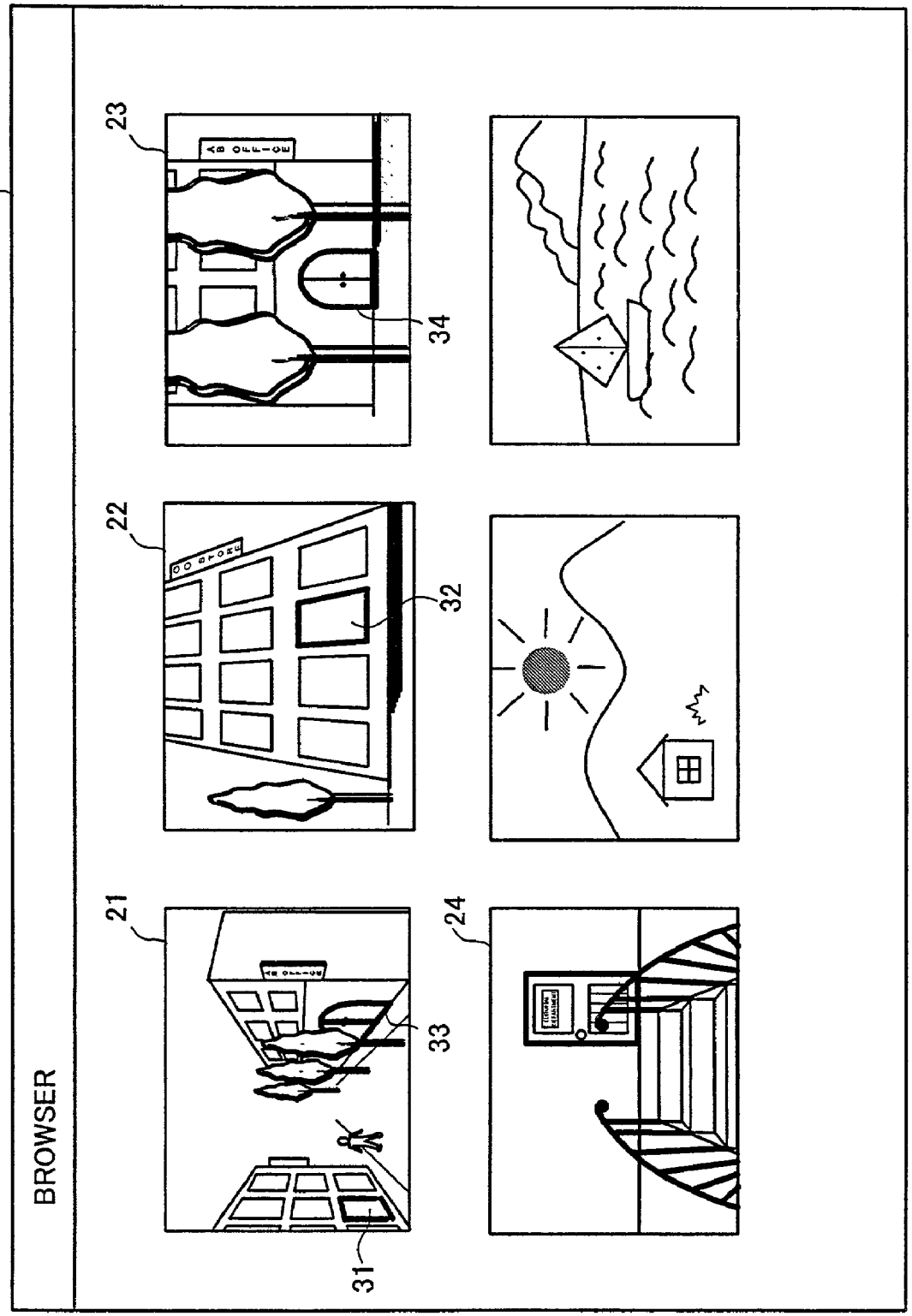
FIG. 3 illustrates exemplary pictorial images for explaining the pseudo 3-D representation system of FIG. 2.
Figure 4:
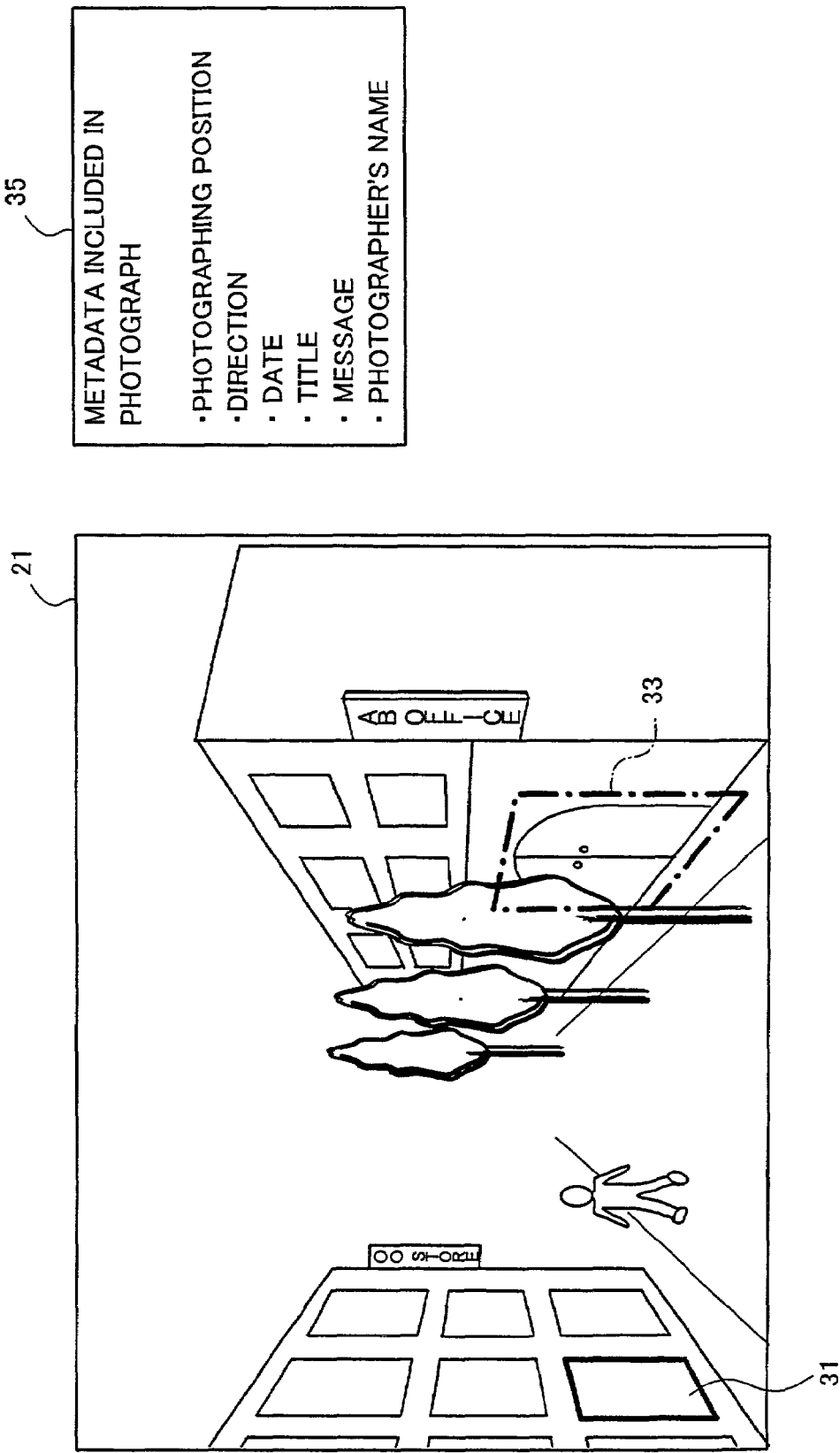
FIG. 4 illustrates an exemplary pictorial image for explaining the pseudo 3-D representation system of FIG. 2.
Figure 5:
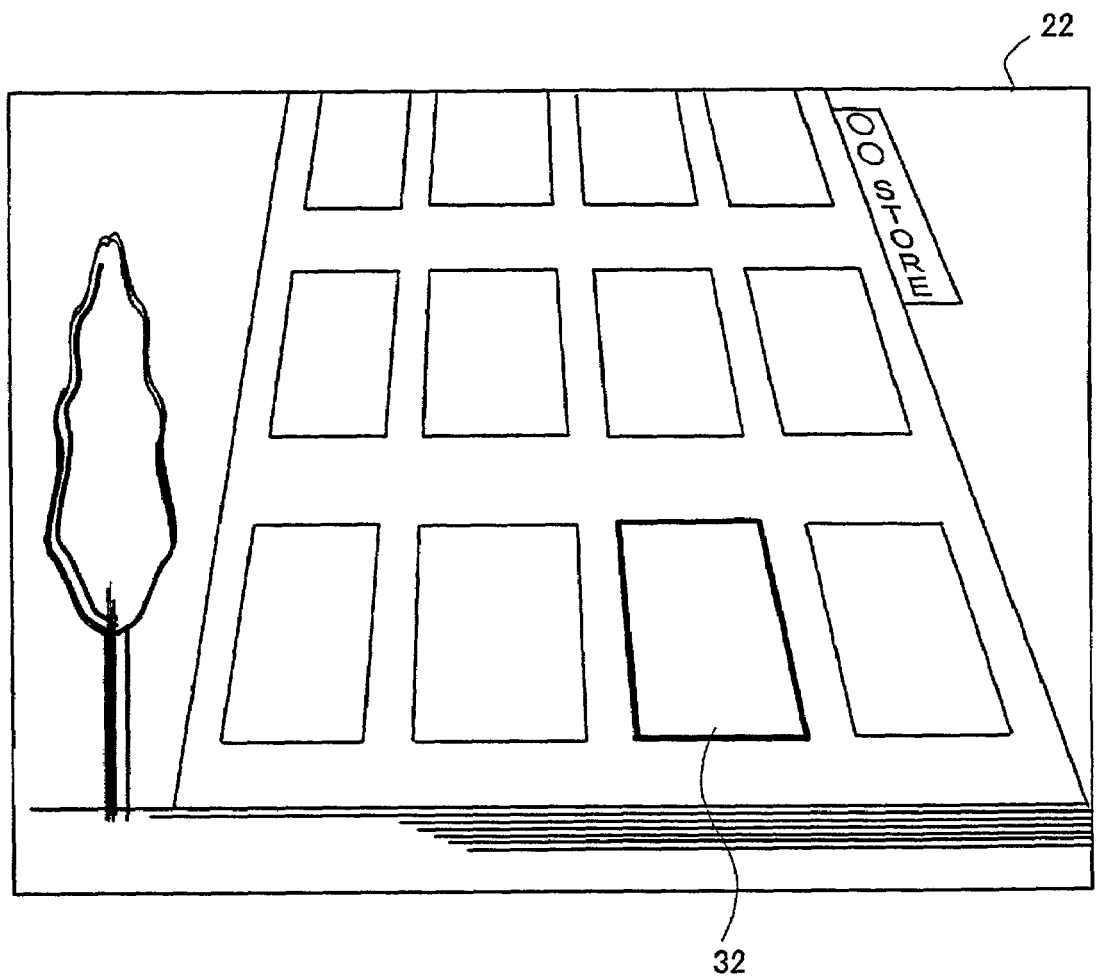
FIG. 5 illustrates an exemplary pictorial image for explaining the pseudo 3-D representation system of FIG. 2.
Figure 6:
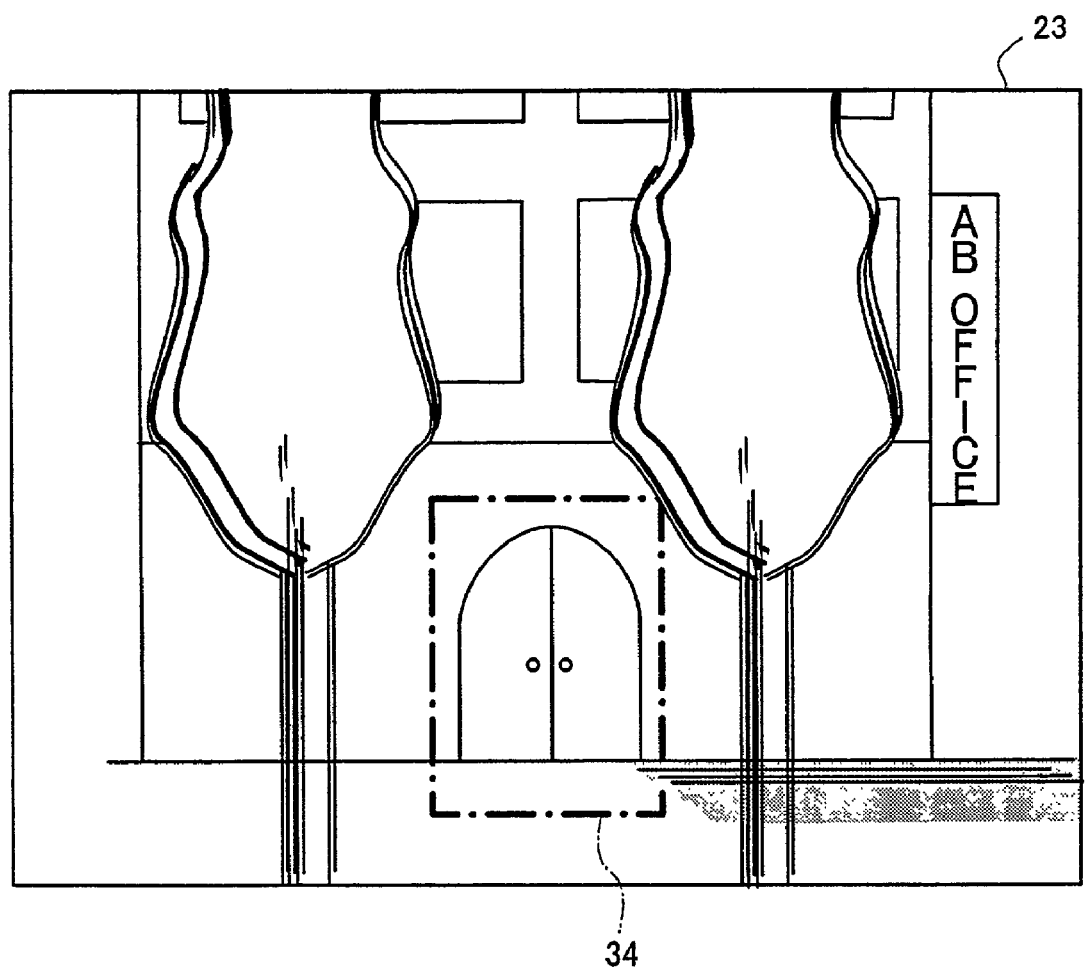
FIG. 6 illustrates an exemplary pictorial image for explaining the pseudo 3-D representation system of FIG. 2.

FIG. 3 shows an exemplary browser for browsing a plurality of images and specifying a certain area on each of the images. FIGS. 4 to 6 show enlarged views of images shown on a screen of the browser of FIG. 3.

For specifying areas on images, the present system may be provided with an operation display means 11 and an area specifying means 12 whereby the user can specify the areas. The operation display means 11 such as a conventional browser may display a plurality of images 21 to 24. The area specifying means 12 allows the user to specify an object-including area on each of two or more images, i.e. same feature or area for two or more images, presented on a display screen. For example, the browser 20 allows the user to specify a certain area 31 (a window second from the right on the first stair of a building "OO" store) with an enclosing rectangle by using a pointing device such as a mouse. In the shown case, the user specifies, by way of example, a set of areas 31 and 32 and a set of areas 33 and 34 are specified by the user with the area specifying means 12. The specified paired areas are then associated with each other by the specified areas correlating means 13.

The browser 20 serving as the operation display means 11 may be simply enough to display a plurality of images. For example, the system capable of presenting a part of images or all images (to be described later) on a web server through the Internet can work with a web browser included in the user' personal computer registered as a web client.

For each pair of the associated specified areas, one or both images are transformed by affine transformation by the image transforming means 14 so that two paired specified areas may match each other in shape. The transformed images are displayed as superposed on each other by the image display means 15.

The area specifying and shape transforming method will be further described below.

In the present system, shapes of photographic images are automatically transformed in accordance with areas specified by the user. Thus, this system makes much use of human's spatial cognition of perspective scenes and creates pseudo 3-D vision of the object. The calculations conducted in the computer are only two-dimensional.

The operation is described, for example, with reference to an image A (21) and an image B (22). The user now designated an area "a" (31) on the image 21 and an area "b" (32) on the images 22. The specified areas may have any polygonal shape having three or more vertices such as rectangle, triangle and so on. A circular area may be approximated by a polygon having the finite number of vertices. As described previously, the area may not always exist within the frame of the image. The computer automatically transforms the images according to the areas specified by the user.

In case of transforming the photo image B (22) relative to the photo image A (21), a matrix F mapping the area b (32) into the area a (31) is calculated according to the equation (1). The transformation of the photo B (22) is achieved by multiplying 4 points on the shape of the photo B (22) by the obtained matrix F according to the equation (2).

$$b \cdot F = a \quad (1)$$

$$(\text{Transformed shape of the image}) = B \cdot F \quad (2)$$

In case of transforming the photo A (21) relative to the photo B (22), the above operations may be conducted by substitute A and a into B and b respectively in the above equations.

The present system enables the user to experience non-Euclidean visual spaces by transforming images according to transforming rectangles of the images using affine-transformation. Namely, photos taken from different directions or images prepared from different intended directions may be transformed to match in shape and may be correctly superposed on each other. A series of photos each having perspective representation are organized into a group by nesting one perspective within another perspective. A basic feature of the present invention is to navigate by arranging thus organized perspectives according to distorted non-Euclidean coordinates. Non-perspective, evenly focused drawing method is now known by a keyword name of "super-flat". The present invention is featured by creating further multi-dimensional representation linking a series of "super-flat" images.

Figure 7:
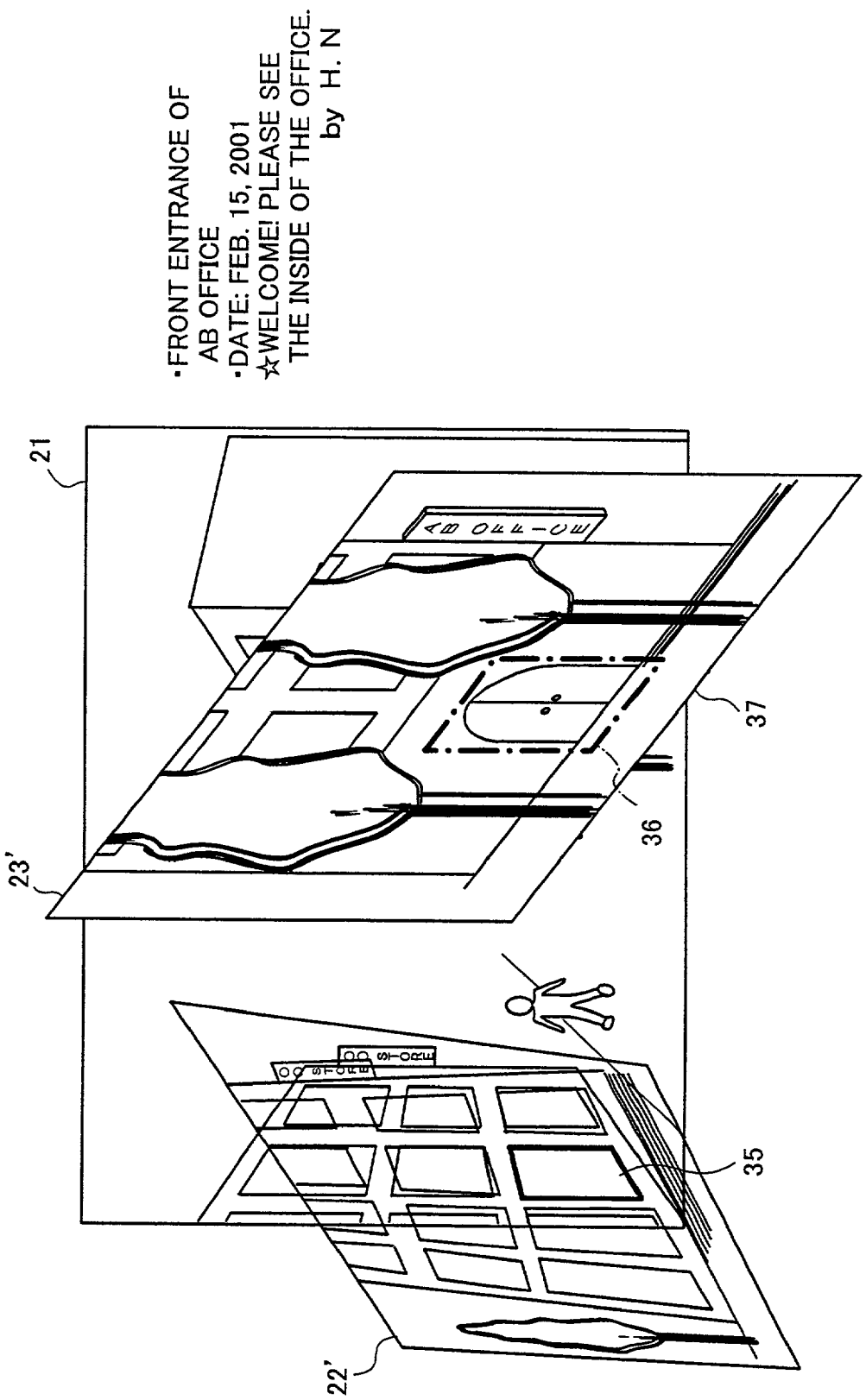
FIG. 7 illustrates exemplary pictorial images for explaining the pseudo 3-D representation system of FIG. 2.

FIG. 7 shows an exemplary representation of an image with two images superposed thereon.

When a pair of the area 31 on the image 21 and the area 32 on the image 22 of FIG. 3 is needed to distortedly display together with a pair of an area 33 on the image 21 and an area 34 on the image 23 of FIG. 3, the images 22 and 23 are transformed by affine transformation to produce images 22' and 23' respectively and then superposed on the untransformed original image 21 as shown in FIG. 7.

In FIG. 7, there is an illustration of an image with two images superposed thereon, which is displayed by the present system provided with a transparency specifying means 16 for specifying transparency of one image relative to the other. In this case, the image display means 15 displays each image at the transparency specified by the transparency specifying means 16. In FIG. 7, the image 21 can be browsed (seen) through the transformed images 22' but the transparency of the transformed image 23' relative to the image 21 is set at 0 (not transparent).

The present invention may attach metadata to each image and has a metadata display means $15_1$ for displaying metadata of an image 23' (23) selected by the user, for example, with a mouse's pointer 37 indicating on the image. The metadata is not limited to a transformed image and may be of course displayed for its original image. The metadata may include subjective private information. The metadata of each image made by the computer graphics may include information about date, a name of a place, a title, message and a name of creator. The metadata of photos may include information about a photographing position, direction, date, a title, message, a name of a photographer and so on. The metadata of other images may include similar information. In FIG. 7, the image 23' (23) has a message informing that this image 23 was taken by a photographer named H. N. on the date of Feb. 15, 2001 and a photo of the inside of a AB office can be browsed by specifying a certain area (an area 36 enclosing a front entrance in the shown case).

As described above, the present system is capable of making much use of human's spatial cognition of perspective scenes and representing a pseudo 3-D space using a plurality of images. However, in order to construct more realistic pseudo 3-D spaces, the system must be developed to enable users to not only browse in the created pseudo 3-D space but also experience traveling in the same space. Another embodiment of the present system, which is capable of making users experience traveling through the created pseudo spaces, will be described below.

Figure 8:
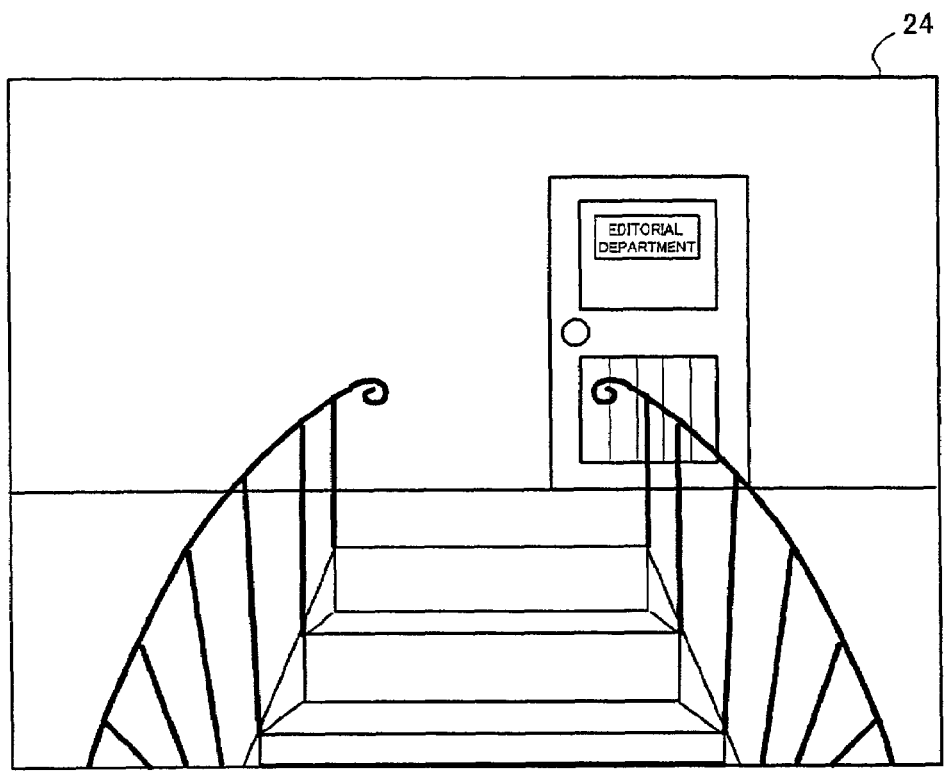
FIG. 8 illustrates an exemplary pictorial image for explaining the pseudo 3-D representation system of FIG. 2.

FIG. 8 shows an exemplary image for explaining a pseudo 3-D space representation system according to another embodiment of the present invention. The image of FIG. 8 corresponds to a part of the image shown in FIG. 7 but indicates it by a modified display method.

The present system may be constructed so that its image display means 15 is further provided with an area presenting means $15_4$ and an image display changing means $15_3$. The area presenting means $15_4$ is used for selectively presenting an area on an image, which is associated with an area in another image. For example, the area 36 on the image 23' of FIG. 7 is selectively presented to the user by this means. The user may select the area using a mouse and the like but preferably in a different way from the method described before with the area specifying means 12. For example, when the user placed a pointer 37 of the mouse over a selectable area, the same area is emphasized to indicate it is selectable. Alternatively, the metadata may be presented to inform the user of the area being selectable. When an area (e.g., the area 36 in FIG. 7) presented by the area presenting means $15_4$ on the current image was selected by the user, the display image changing means $15_3$ changes the current image to an original (not-transformed) image of another associated image (e.g., an image 24 of FIG. 8, which represents for example an image behind the door within the area 36).

Figure 9:
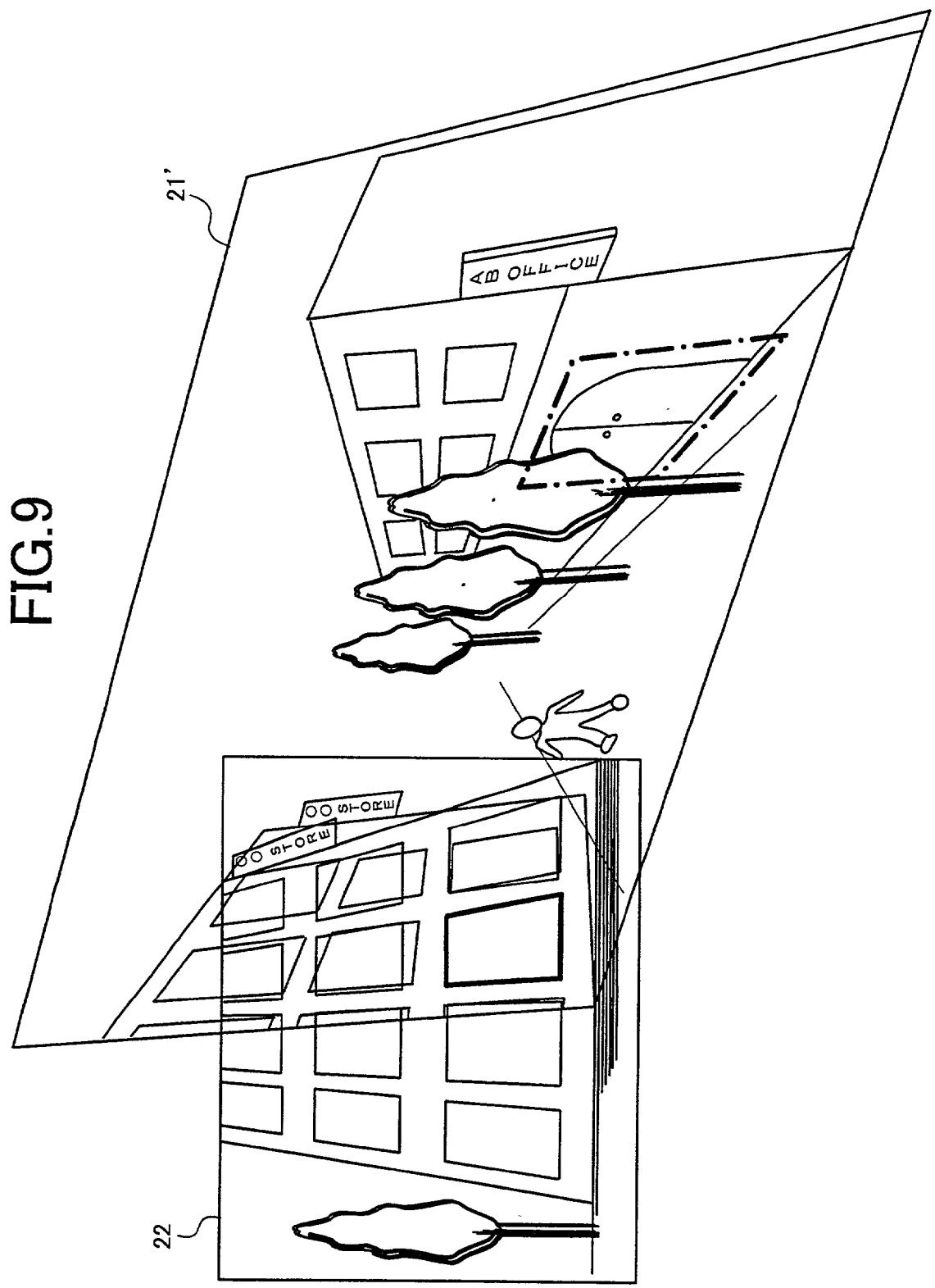
FIG. 9 illustrates exemplary pictorial images for explaining the pseudo 3-D representation system of FIG. 2.

FIG. 9 shows exemplary images for explaining a pseudo 3-D space representation system according to another embodiment of the present invention. The images correspond to modified images of FIG. 7.

The present system according to this embodiment may be provided at the image transforming means 14 with a means for transforming image shape in order that the selected image or the specified image of the both images superposed each other by the image display means is transformed to the original shape. The image shape is the shape of the other image of the both images or the both images. In this case, the image shall be provided with information (ex. link information) about the current image for transformation. In addition, the image display means 15 is provided with an image presenting means $15_2$ for selectively presenting images other than originals and a display image changing means $15_3$ for changing the display image into both images transformed by the image transforming means $15_3$. The image presenting means $15_2$ may present merely selectable images. The display image changing means $15_3$ selects an image 22' and rotates it to restore it original image 22, thus changing angles of displaying images 21, 22' and 23' and obtaining images 22 and 21' as shown in FIG. 9. In FIG. 9, the images 22 and 21' are presented in reduced scale for the limit of paper but they may be displayed in the same (or enlarged/reduced) scale for the original image 22 on the display screen.

Figure 10:
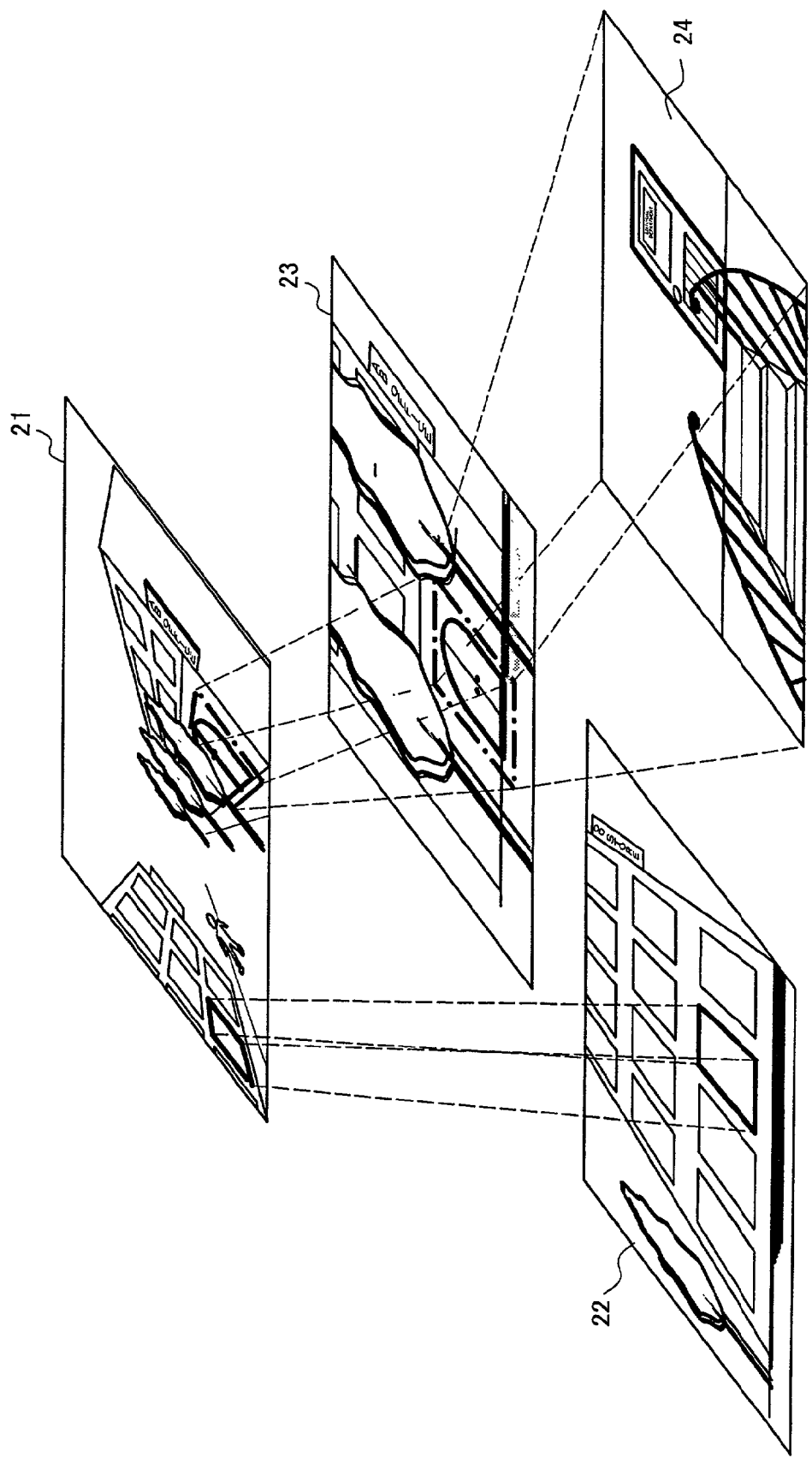
FIG. 10 illustrates exemplary pictorial images for explaining the pseudo 3-D representation system of FIG. 2.

Images 21 to 24 of FIGS. 3 to 9 are associated with each other in positions as shown in FIG. 10.

In the embodiments described with reference to FIGS. 8 and 9, the scale of display image is changed depending upon an original image to be displayed as a basic image on the display screen. For a user who will experience pseudo 3-D spaces created by the present invention, it is preferable to further improve the present system to present the process of changing the display image by the display image changing means $15_3$. An interpolation image displaying means $15_5$ for presenting the process of changing the display image is now described below.

The system according to another embodiment of the present invention may be provided at the image transformation means 14 with an interpolation image generating means $14_1$ for generating by affine transformation a series of interpolating images to be successively displayed until the next original image is displayed. The next original image corresponds for example to an image 24 in FIG. 8 or an image 22 in FIG. 9. Furthermore, this embodiment is also provided at the display image changing means $15_3$ with an interpolation image display means $15_5$ (or a separate interpolation image display means $15_5$) for displaying a series of interpolation images generated by the interpolation image generating means $14_1$. A series of images to be generated by the interpolation image generating means $14_1$ and subsequently displayed by the interpolated image displaying means $15_5$ may be of the following type. Not-transformed or transformed images are subsequently transformed in shape through affine transformation to produce a series of images interposable between the not-transformed image and the original of the next image, which are then displayed in succession. The transformation (deformation) of the image by affine transformation can create all kinds of pseudo movement of an image, such as rotation, enlargement/reduction, horizontal movement and so on.

For example, an image (e.g., a focused photo) slowly restores its rectangular shape as it moves frontward and other relevant images (photos) retard to corresponding positions, changing themselves in shape.

There are various interpolating methods. The present system in another modified embodiment of the present invention is further provided with a traversing time changing means for representing pseudo temporal distance. The traversing time changing means is used for changing time taken for changing from an unchanged image to an original image based on a difference between an unchanged image and an original image, which are, for example, parameters generated by multiplying each of rotation value, horizontal movement value, enlargement/reduction value by specific coefficients respectively. Furthermore, the interpolation image generating means $14_1$ may be provided with a means for generating a number of interpolation images based on the difference value. For photos of an existing building, it is easily understood that a distance between two buildings is larger if a difference between two photos is larger.

In another embodiment of the present system, each image has metadata including at least time information and the display image may be changed to another image based on the time information included in the metadata attached to the image. Namely, a time necessary for changing the display image from one original image to another original image (or reverse) is calculated from the time information and changing the original image to the next original image is completed within the calculated duration time.

In another embodiment of the present invention, changing the display image from one original image to another may be completed based on location information included in the metadata attached thereto. In this case, the metadata includes information about a location and direction of the image. By using the metadata, the system can specify the relation between locations of two images and complete changing the original image based on the specified relative locations of two images. For example, if two images are far from each other, it may take time for changing the first image to the second image.

In the above-described embodiments, images (original images) may be displayed in a predetermined order. In this case, the image display means 15 may be provided with a means for displaying two or more specified images successively in a specified order. This embodiment can subsequently browse the original images and intermediate images between them without requiring user's manual operation.

In the above-described embodiments, it is possible to provide every image with metadata such as information about a location and a direction, associate the image, i.e., its metadata, with an electronic map, paste the image to the corresponding site on the electronic map and present it to the user. The image is first transformed through affine transformation based on the location and direction information included in the metadata, then it is pasted on the electronic map and made transparent through which the other image can be browsed. Some images are associated with other images and some images may be independent. This modified embodiment can represent images in various states on an electronic map. For example, an image can be displayed in standing state on a corresponding position on the map.

Alternatively, a message informing of an existing image is presented at the same position on the map to make the image appears thereon when the message is clicked by the user.

When this embodiment of the present system is applied to a Bulletin Board System (BBS), it become possible to associate user's photos put thereon by using "spaces" as a key without dealing with user's photos as independent ones to reproduce a pseudo 3-D continuous space with the images. Plural photographic images may be organized by two methods: one using an electronic map (according to absolute positions) and the other using relations of photos (according to relative positions). The present embodiment can use both methods. This function of the embodiment is expected to create new communications with images by using spatial and temporal keys on the BBS. For example, a photo put by a user on the BBS may receive a spatial response "a similar place is here" or a temporal response "this place was such in the past" or an interactive discussion or dialogue "Regarding this place I think that . . . " with the fixed space and time. It is also expected that plans of the future in addition to past scenes may be increasingly put on the BBS.

A pseudo 3-D space representation system according to another embodiment of the present invention may identify an area specified by a user on one image, retrieve another image having an area common to that specified on the preceding image and merge them. This system is composed mainly of a specified area transforming means, an area retrieving means, an image transforming means and an image display means. It may also include features of the above-described embodiments. The system transforms first an object-including area specified on an image through affine transformation by using the specified transforming means and then retrieves other images having parts common to the specified area by using the area retrieving means. The area retrieving means may be realized by applying the known image cognition and feature extraction technique. The system transforms one or both images by matching the specified area with the retrieved/extracted area through affine transformation by the image transforming means and displays the both images as superposed on each other. The system may retrieve a common area on another image, allowing the user to recognize whether the retrieved area matches the specified area or not.

Although the pseudo 3-D space representation systems embodying the present invention have been described hereto, the present invention may be embodied as a pseudo 3-D space representation method comprising processing steps as described before for the technical means.

For example, an area specified on an image and an area specified on another image or plural pairs of specified areas are associated as common areas and one or both images are transformed by affine transformation to match the specified areas on two images and both images are displayed as superposed one over the other. In this case, plural images may be displayed on the screen so that the user may specify areas including a common object on two or more images.

A specified area on an image is transformed by affine transformation and an area common to the specified area is retrieved from plural images, one or both images are transformed by affine transformed and displayed as superposed one over the other by matching the corresponding areas. In this case, plural images may be displayed on the screen so that the user may specify areas including a common object on two or more images.

In addition to the above-described pseudo 3-D space representation systems and methods according to the present invention, the present invention may be also embodied as a pseudo 3-D space constructing system for constructing pseudo 3-D space by using the pseudo 3-D space representation system, a game system for playing a game by linking images by using the pseudo 3-D space representation system, an electronic map display system for displaying an electronic map with images that are pseudo 3-D spatial representation prepared by the pseudo 3-D space representation system, an electronic map providing system for providing pseudo 3-D space representing images through a network and a navigation system for navigating users with pseudo space representing images through a network, which will be described below respectively. Methods for those systems are omitted since they comprise the same procedures as the respective systems do.

The FIG. 11 is a view for explaining a pseudo 3-D space constructing system according to an embodiment of the present invention.

The pseudo 3-D space construction system, i.e., a network collaboration system comprises a server device 41 connected to a plurality of client devices 43a, 43b . . . (hereinafter referred to a representative device 43), which server device may serves as the pseudo 3-D space representation system according to any one of the embodiments of the present invention. The server device 41 has a database (DB) 42 and provides a pseudo 3-D space representation system to the client devices 43 through a network. The client device 43 may be any of terminals connectable to the network, including, but not limited to, a personal computer, a mobile personal computer, a portable telephone set, a PHS, a PDA, a TV and so on. For example, the server device 41 may be a multilayer system composed of a database server for managing the database DB42 and a web server for providing the pseudo 3-D space representation system to the clients. The web client device 43 may use the web server by using a web browser that the device has. An image is associated by the client device 43 with a specified area on an image stored in the database 42 by using the pseudo 3-D space representation system and then stored in the database 42 of the server device 41. The pseudo 3-D spatial data prepared by the client device is stored into the database server through the network 44. Thus, the prepared pseudo 3-D spaces can be anytime reused and open to public on the web network. It is also possible to add data thereto and update the data therein anytime.

The functions of the present system are described below. In this case, the used images are photos.

(1) A series of taken photos are automatically synthesized by a command "specifying area" for specifying common-part areas on photos.

(2) The shapes of the photos are transformed by affine transformation to completely superpose the specified common parts. This can create the pseudo 3-D spatial representation.

(3) A series of photos are associated subsequently by the above-described method.

(4) Even photos lacking in common parts (objects) can be synthesized by selecting the outside (probably common) portions of both photos.

(5) When all photos were associated to create a pseudo 3-D space, the prepared data is transmitted and stored into the server through a common gateway interface (CGI).

(6) The pseudo 3-D spaces stored in the server can be acquired from anywhere and anytime on the Internet.

(7) Newly taken photos can be added anytime to the pseudo 3-D spaces stored in the server. A pseudo 3-D space prepared by a client can be expanded and refined by adding other photos by different clients. On the other hand, the pseudo 3-D space prepared by a client can be protected by his password against adding thereto any photos by other client.

(8) It is possible to attach more information to each photo such as a name of a photographer, date, a message about object and aim, etc. The viewer can read the messages of each photo at the same time of experiencing the pseudo 3-D space.

(9) The present system is highly expected to apply for creating a virtual city or a virtual building space, which allows anyone to freely contribute photos.

The game system is now described in detail. The game system is intended to play a game in which the user conducts merging all images by specifying an area on each of the selected images and repeating the same operation by using a pseudo 3-D space representation system embodying the present invention. The image database stores in advance a plurality of grouped images linkable by areas in the predetermined sequence. A group of images is presented to the user who in turn specifies an area on each of two images selected from the presented images.

If the two areas are merged, points are given to the user. The remaining images excepting the merged images are then presented for selection by the user. By repeating the above operation, the user merges all images to create, for example, a virtual town space.

The electronic map display system is to display on an electronic map a pseudo 3-D spatial representation prepared by using the pseudo 3-D spatial representation system embodying the present invention. Various methods may be applied for displaying an image of a pseudo 3-D space representation on the electronic map. For example, the database containing the pseudo 3-D spatial images with information such as the latitude/longitude, address and the like and the database containing electronic maps are associated with each other and information linking to the pseudo 3-D spatial image is attached to the electronic map information. Alternatively, the pseudo 3-D spatial image is embedded in the electronic map information so that the electronic map may be displayed together with the spatial image on a display of the client personal computer or the like.

The electronic map providing system comprises a server device connected to a plurality of client devices via a network. The server device has an electronic map database storing a pseudo 3-D spatial electronic map in which pseudo 3-D spatial images created by the pseudo 3-D space representation system according to any of the embodiments of the present invention are embedded in the corresponding positions or linking information is attached thereto. In response to an inquiry from any client device, the system retrieves the pseudo 3-D spatial electronic map from the electronic map database and supplies it to the client device. The corresponding position for a pseudo 3-D spatial image having information about lattice/longitude and address means the position specified by the same information or relevant positional information on the electronic map. The client device may be any one of terminals connectable to the network, for example, such as a personal computer, a mobile computer, a potable telephone set, a PHS, a PDA and a TV. The server device may be a multilayered (hierarchical structured) system composed of a database server for managing the database and a web server for providing the pseudo 3-D space representation system to the clients. The client device may use the above-described system by using a web browser that the device has.

The navigation system is provided with a server device that is connectable via a network to a plurality of client devices capable of detecting their current positions and has an electronic map database. The electronic map database contains a pseudo 3-D spatial electronic map which has pseudo 3-D spatial images created by the pseudo 3-D space representation system according to any of the embodiments of the present invention and embedded in the corresponding positions thereon or has linking information attached thereto. A variety of data retrieval is thus realized by this system.

In response to a client's access with information about the present position of the client device, the system searches in the electronic map database and supplies a pseudo 3-D spatial electronic map corresponding to the client present position to the client device, thus navigating the user of the client device via the network. There is a variety of navigating methods. One of the methods is to set a target point and display a route thereto on a map with a pseudo 3-D spatial image presented on the client device. The client device may be a personal computer and a mobile computer but not limited to them. Namely, it may be any of terminals capable of being connected to the Internet and detecting the current position, for example, such as a portable telephone set, a PHS, PDA and, further more, a car navigation system for receiving a part of or all map information from the outside source. The server device may be a multilayered system composed of a database server for managing the database and a web server for providing the pseudo 3-D space representation system to the clients. The client device may use the above-described system by using a web browser that the device has. Utilizing the pseudo 3-D spatial representation, the navigation system can provide navigation with a bird-eye viewed map in combination with relevant spatial images, making it easier for users to recognize the current position on the map. More effective use of pseudo 3-D spatial representation for navigation with the electronic map can be realized by previously embedding positional information in each of original images composing the pseudo 3-D spatial representation and by displaying the images in the given sequence.

When a user-creator creates a navigation space from his personal computer connected to the Internet, he uploads own photos into a server or a separately provided database server if the former cannot be used. Then, the user associates the photos by enclosing the same object including areas with a drawing tool "enclosing the same area" open on the site, transmits the created data to the data base server and stores the data therein. This enables the user to read navigation data from the database server and photos from the server into the personal computer and associate them to browse the created navigation images. At the same time, the user can write additional data in the navigation data from the personal computer. The use of this data adding function can make richer the content of the electronic map.

The navigation system may be implemented with only the above-described database of the electronic map data.

This embodiment may be realized by incorporating the electronic map database into any of terminals such as a mobile personal computer, a portable telephone set, a PHS and a PDA. This embodiment may navigate the user by detecting the present position, retrieving the electronic map database according to the detected present position and displaying the required pseudo 3-D spatial electronic map.

According to the present invention, it is possible to create a pseudo 3-D space with a plurality of 2-D images (photos)

by specifying common parts on the image by simple area-specifying operation. In other words, a pseudo 3-D space representation can be created by using images with a restricted visual field. For example, a pseudo 3-D space representation can be easily produced from a plurality of photographic images taken by a conventional (not-professional) camera. While the QuickTime-VR system requires 360-degree panoramic scene, the system according to the present invention can build up the 3-D spaces with photos taken with restricted visual fields. This enables users to create pseudo 3-D spaces with ordinary photos taken past without such intention.

According to the present invention, it is possible to represent all kinds of movements such as rotation, enlarge/reduction, horizontal movements in pseudo 3-D spaces. The QuickTimeVR system cannot realize movements except for rotation (looking around) from a fixed visual point and zooming in/out (enlargement/reduction). In contrast, the present invention makes it possible to represent all kinds of relative movements of images (photos). Namely, it can realize all kinds of movements and actions, enabling users to easily create and publish pseudo 3-D spatial contents on the Web.

According to the present invention, it is possible to provide pseudo 3-D spaces as an open system on the Web. In other words, the present invention enables users to create pseudo 3-D spatial contents on the Web site with no use of specific software by accessing the site using a web browser. This reduces a load on the user side. This eliminates the need to use a specific tool. This considerably reduces the possibility that users depend on specific operating system (Window/Mac/Unix).

According to the present invention, it is possible to transmit subjective and private information as photographic images and to automatically construct (generate) a pseudo 3-D virtual space with a large number of photographs. By applying the present invention to an ordinary BBS system, it becomes possible for users to contribute photos to the web server to exchange subjective and private thoughts and have communications through visual contents.

According to the present invention, it is possible to link created spatial contents one another on the Web network. It becomes possible to create a virtual city autonomously extending its content with users' contributions. This function is expected to develop local communities. Namely, the present invention is applied to produce a pseudo 3-D space with a large number of photos contributed by ordinary people and make it open to public on the Web site, which may be developed (extended and refined) by contributors into a unique public space.

According to the present invention, it is possible to provide visual navigations with a map viewed from bird-eyes in combination with pseudo 3-D spatial representations. This enables users to easily understand the relationship between the map position and the current position.

The present invention provides a general purpose computer system for every user to easily create and publish pseudo 3-D spaces with photographs without any special tools on the Internet. Therefore, the system may find new various applications. It may be further developed by people who will actively experience in pseudo 3-D spaces and transmit the creative information, bringing new viewpoints and useful information in the various application fields. The computer system may considerably contribute in forming an information society with circular IT networks that enables everyone to transmit information. From the viewpoint of construction, analysis and evaluation of virtual three-dimensional spaces, the system of the present invention is highly expected for apply in the fields of civil engineering, architecture, landscape engineering, environmental planning, space cognition technique, GIS, information science and spatial information science.

What is claimed is:

1. A pseudo 3-D space representation system for representing a pseudo 3-D space with a plurality of 2-D images, comprising:
   a specified area associating means for associating one or more sets of areas specified on one image and the other image or images as common parts;
   an image transforming means for transforming one or both images through affine transformation by matching the corresponding areas specified on the images; and
   an image display means for displaying both images as superposed on each other;
   wherein the image transforming means has a means for transforming image shape in order that the selected image or the specified image of the both images superposed each other by the image display means is transformed to the original shape, the image shape being the shape of the other image of the both images or the both images, and the image display means has an image presenting means for presenting selectable images other than the original one and a display image changing means for changing the displayed images by displaying both images transformed by the image transforming means.

2. A pseudo 3-D space representation system for representing a pseudo 3-D space with a plurality of 2-D images, comprising:
   a specified area transforming means for transforming an area specified on an image through affine transformation;
   a specified area retrieving means for retrieving a part common with the specified area from plural images;
   an image transforming means for transforming one or both images through affine transformation in such a way that the specified area and the retrieved area may matched with each other; and
   an image display means for displaying both images superposed on each other;
   wherein the image transforming means has a means for transforming image shape in order that the selected image or the specified image of the both images superposed each other by the image display means is transformed to the original shape, the image shape being the shape of the other image of the both images or the both images, and the image display means has an image presenting means for presenting selectable images other than the original one and a display image changing means for changing the displayed images by displaying both images transformed by the image transforming means.

3. A pseudo 3-D space representation system for representing a pseudo 3-D space with a plurality of 2-D images, comprising:
   a specified area associating means for associating one or more sets of areas specified on one image and the other image or images as common parts;
   an image transforming means for transforming one or both images through affine transformation by matching the corresponding areas specified on the images; and
   an image display means for displaying both images as superposed on each other;

wherein the image display means has an area presenting means for selectively presenting an area on an image associated with an area on another image and a display image changing means for changing display image by displaying the associated original image of the another image when the area presented by the area presenting means is selected.

4. A pseudo 3-D space representation system for representing a pseudo 3-D space with a plurality of 2-D images, comprising:
   a specified area transforming means for transforming an area specified on an image through affine transformation;
   a specified area retrieving means for retrieving a part common with the specified area from plural images;
   an image transforming means for transforming one or both images through affine transformation in such a way that the specified area and the retrieved area may matched with each other; and
   an image display means for displaying both images superposed on each other;
   wherein the image display means has an area presenting means for selectively presenting an area on an image associated with an area on another image and a display image changing means for changing display image by displaying the associated original image of the another image when the area presented by the area presenting means is selected.

5. A pseudo 3-D space representation system for representing a pseudo 3-D space with a plurality of 2-D images, comprising:
   a specified area associating means for associating one or more sets of areas specified on one image and the other image or images as common parts;
   an image transforming means for transforming one or both images through affine transformation by matching the corresponding areas specified on the images; and
   an image display means for displaying both images as superposed on each other;
   wherein an image is provided with metadata including at least information about a position and a direction thereof and there is provided a means for identifying a position of the image based on the each metadata and associating the metadata with the electronic map and a means for displaying the image identified by the metadata on the electronic map.

6. A pseudo 3-D space representation system for representing a pseudo 3-D space with a plurality of 2-D images, comprising:
   a specified area transforming means for transforming an area specified on an image through affine transformation;
   a specified area retrieving means for retrieving a part common with the specified area from plural images;
   an image transforming means for transforming one or both images through affine transformation in such a way that the specified area and the retrieved area may matched with each other; and
   an image display means for displaying both images superposed on each other;
   wherein an image is provided with metadata including at least information about a position and a direction thereof and there is provided a means for identifying a position of the image based on the each metadata and associating the metadata with the electronic map and a means for displaying the image identified by the metadata on the electronic map.

7. A game system for playing a game for specifying an area on an image by using a pseudo 3-D space representation system for representing a pseudo 3-D space with a plurality of 2-D images, comprising:
   a pseudo 3-D space representation system for representing a pseudo 3-D space with a plurality of 2-D images, comprising:
   a specified area associating means for associating one or more sets of areas specified on one image and the other image or images as common parts;
   an image transforming means for transforming one or both images through affine transformation by matching the corresponding areas specified on the images; and
   an image display means for displaying both images as superposed on each other;
   such that further specifying an area of another image associated with the specified area and repeating the same until all specified images are linked, which has an image database storing a plurality of image groups each composed of a plurality of images associated with each other in such a way that areas of images can be linked only in a specified order and which presents a group of images for users to specify areas one on each of two images, links two specified areas, adds points of the links and presents remaining images of the group excepting two images which areas were specified and repeats the same steps.

8. A game system for playing a game for specifying an area on an image by using a pseudo 3-D space representation system for representing a pseudo 3-D space with a plurality of 2-D images, comprising:
   a pseudo 3-D space representation system for representing a pseudo 3-D space with a plurality of 2-D images, comprising:
   a specified area transforming means for transforming an area specified on an image through affine transformation;
   a specified area retrieving means for retrieving a part common with the specified area from plural images;
   an image transforming means for transforming one or both images through affine transformation in such a way that the specified area and the retrieved area may matched with each other; and
   an image display means for displaying both images superposed on each other;
   such that further specifying an area of another image associated with the specified area and repeating the same until all specified images are linked, which has an image database storing a plurality of image groups each composed of a plurality of images associated with each other in such a way tat areas of images can be linked only in a specified order and which presents a group of images for users to specify areas one on each of two images, links two specified areas, adds points of the links and presents remaining images of the group excepting two images which areas were specified and repeats the same steps.

9. An electronic map display system, comprising a pseudo 3-D space representation system for representing a pseudo 3-D space with a plurality of 2-D images, said pseudo 3-D space representation system comprising:
   a specified area associating means for associating one or more sets of areas specified on one image and the other image or images as common parts;
   an image transforming means for transforming one or both images through alike transformation by matching the corresponding areas specified on the images; and an image display means for displaying both images as superposed on each other;

wherein said pseudo 3-D space representation system is embedded in a corresponding position on an electronic map or is linked thereto and displayed thereon.

10. An electronic map display system, comprising a pseudo 3-D space representation system for representing a pseudo 3-D space with a plurality of 2-D images, said pseudo 3-D space representation system comprising:

a specified area transforming means for transforming an area specified on an image through affine transformation;

a specified area retrieving means for retrieving a part common with the specified area from plural images;

an image transforming means for transforming one or both images through affine transformation in such a way that the specified area and the retrieved area may matched with each other; and an image display means for displaying both images superposed on each other;

wherein said pseudo 3-D space representation system is embedded in a corresponding position on an electronic map or is linked thereto and displayed thereon.

11. An electronic map providing system comprising a server device having an electronic map database containing a pseudo 3-D spatial electronic map prepared by embedding in corresponding positions thereof or linked thereto pseudo 3-D space representation images created by using a pseudo 3-D space representation system for representing a pseudo 3-D space with a plurality of 2-D images, said 3-D space representation system comprising:

a specified area associating means for associating one or more sets of areas specified on one image and the other image or images as common parts;

an image transforming means for transforming one or both images through affine transformation by matching the corresponding areas specified on the images; and an image display means for displaying both images as superposed on each other;

wherein the server device connected to a number of client devices through a network retrieves the pseudo 3-D special electronic map in the electronic map database in response to access from the client device and provides it to the client device.

12. An electronic map providing system comprising a server device having an electronic map database containing a pseudo 3-D spatial electronic map prepared by embedding in corresponding positions thereof or linked thereto pseudo 3-D space representation images created by using a pseudo 3-D space representation system for representing a pseudo 3-D space with a plurality of 2-D images, said 3-D space representation system comprising:

a specified area transforming means for transforming an area specified on an image through affine transformation;

a specified area retrieving means for retrieving a part common with the specified area from plural images;

an image transforming means for transforming one or both images through affine transformation in such a way that the specified area and the retrieved area may matched with each other; and an image display means for displaying both images superposed on each other;

wherein the server device connected to a number of client devices through a network retrieves the pseudo 3-D special electronic map in the electronic map database in response to access from the client device and provides it to the client device.

13. A navigation system comprising a server device comprising an electronic map database containing a pseudo 3-D spatial electronic map comprising a pseudo 3-D space representation system for representing a pseudo 3-D space with a plurality of 2-D images, said pseudo 3-D space representation comprising:

a specified area associating means for associating one or more sets of areas specified on one image and the other image or images as common parts;

an image transforming means for transforming one or both images through affine transformation by matching the corresponding areas specified on the images; and an image display means for displaying both images as superposed on each other;

prepared by embedding in corresponding positions thereon or linked thereto a pseudo 3-D space representation image created by using said pseudo 3-D space representation system, wherein the server device is connected to a number of client devices capable of detecting its present position through network and, in response to an access from any client device indicating its current position, it retrieves in the electronic map database and provides the client device with pseudo 3-D spatial electronic map corresponding to the current position, thus navigating the user of the client device.

14. A navigation system comprising a server device comprising an electronic map database containing a pseudo 3-D spatial electronic map comprising a pseudo 3-D space representation system for representing a pseudo 3-D space with a plurality of 2-D images, said pseudo 3-D space representation comprising:

a specified area transforming means for transforming an area specified on an image through affine transformation;

a specified area retrieving means for retrieving a part common with the specified area from plural images;

an image transforming means for transforming one or both images through affine transformation in such a way that the specified area and the retrieved area may matched with each other; and an image display means for displaying both images superposed on each other;

prepared by embedding in corresponding positions thereon or linked thereto a pseudo 3-D space representation image created by using said pseudo 3-D space representation system, wherein the server device is connected to a number of client devices capable of detecting its present position through network and, in response to an access from any client device indicating its current position, it retrieves in the electronic map database and provides the client device with pseudo 3-D spatial electronic map corresponding to the current position, thus navigating the user of the client device.

15. A navigation system comprising an electronic map database containing a pseudo 3-D spatial electronic map prepared by embedding in corresponding positions thereon or linked thereto a pseudo 3-D space representation image created by using a pseudo 3-D space representation system for representing a pseudo 3-D space with a plurality of 2-D images, said pseudo 3-D space representation system comprising:

a specified area associating means for associating one or more sets of areas specified on one image and the other image or images as common parts;

an image transforming means for transforming one or both images through affine transformation by matching the corresponding areas specified on the images; and an image display means for displaying both images as superposed on each other;

such that said navigation system navigates a user by detecting a current position, searching an electronic map corresponding to the detected current position in the electronic database, and displaying the pseudo 3-D spatial electronic map on a display screen of the user device.

16. A navigation system comprising an electronic map database containing a pseudo 3-D spatial electronic map prepared by embedding in corresponding positions thereon or linked thereto a pseudo 3-D space representation image created by using a pseudo 3-D space representation system for representing a pseudo 3-D space with a plurality of 2-D images, said pseudo 3-D space representation system comprising:

a specified area transforming means for transforming an area specified on an image through affine transformation;

a specified area retrieving means for retrieving a part common with the specified area from plural images;

an image transforming means for transforming one or both images through affine transformation in such a way that the specified area and the retrieved area may matched with each other; and an image display means for displaying both images superposed on each other;

such that said navigation system navigates a user by detecting a current position, searching an electronic map corresponding to the detected current position in the electronic database, and displaying the pseudo 3-D spatial electronic map on a display screen of the user device.

17. An electronic map displaying method comprising preparing a pseudo 3-D spatial representation image utilizing a pseudo 3-D space representing method comprising:

executing steps of displaying a plurality of images to a user, causing the user to specify areas on each of two or more images, associating the specified area of one displayed image with the specified area of the other displayed image as common parts, transforming the shape of one or both images through affine transformation by matching the paired areas and superposing both images;

wherein said pseudo 3-D spatial representation image is embedded in a corresponding position on an electronic map or linked thereto to display the same representation image on the electronic map.

18. An electronic map displaying method comprising preparing a pseudo 3-D spatial representation image utilizing a pseudo 3-D space representing method comprising:

performing the steps of displaying an image to a user, causing the user to specify an area on the displayed image, transforming the specified area by affine transformation, retrieving a part common to the specified area from a plurality of images, transforming the shape of one or both images through affine transformation to match the specified area with the area extracted by the retrieval and displaying both images superposed on each other;

wherein said pseudo 3-D spatial representation image is embedded in a corresponding position on an electronic map or linked thereto to display the same representation image on the electronic map.

19. A navigation method for navigating users, comprising providing through a network a pseudo 3-D spatial electronic map prepared by a pseudo 3-D space representing method comprising preparing a pseudo 3-D spatial representation image, said pseudo 3-D space representing method comprising:

executing steps of displaying a plurality of images to a user, causing the user to specify areas on each of two or more images, associating the specified area of one displayed image with the specified area of the other displayed image as common parts, transforming the shape of one or both images through affine transformation by matching the paired areas and superposing both images;

wherein said pseudo 3-D spatial representation image is embedded in or linked to corresponding positions on the electronic map.

20. A navigation method for navigating users, comprising providing through a network a pseudo 3-D spatial electronic map prepared by a pseudo 3-D space representing method comprising preparing a pseudo 3-D spatial representation image, said pseudo 3-D space representing method comprising:

performing the steps of displaying an image to a user, causing the user to specify an area on the displayed image, transforming the specified area by affine transformation, retrieving a part common to the specified area from a plurality of images, transforming the shape of one or both images through affine transformation to match the specified area with the area extracted by the retrieval and displaying both images superposed on each other;

wherein said pseudo 3-D spatial representation image is embedded in or linked to corresponding positions on the electronic map.

21. A pseudo 3-D space representation system for representing a pseudo 3-D space with a plurality of 2-D images, comprising:

a specified area associating means for associating one or more sets of areas specified on one image and the other image or images as common parts;

an image transforming means for transforming one or both images through affine transformation by matching the corresponding areas specified on the images;

an image display means for displaying both images as superposed on each other;

an operation image display means for displaying a plurality of images; and an area specifying means for allowing a user to specify areas on each of two or more images displayed to the user;

wherein the image transforming means has a means for transforming image shape in order that the selected image or the specified image of the both images superposed each other by the image display means is transformed to the original shape, the image shape being the shape of the other image of the both images or the both images, and the image display means has an image presenting means for presenting selectable images other than the original one and a display image changing means for changing the displayed images by displaying both images transformed by the image transforming means.

22. A pseudo 3-D space representation system for representing a pseudo 3-D space with a plurality of 2-D images, comprising:

a specified area transforming means for transforming an area specified on an image through affine transformation;

a specified area retrieving means for retrieving a part common with the specified area from plural images;

an image transforming means for transforming one or both images through affine transformation in such a way that the specified area and the retrieved area may matched with each other;

an image display means for displaying both images superposed on each other;

an operation image display means for displaying an image; and an area specifying means for specifying an area on the displayed image;

wherein the image transforming means has a means for transforming image shape in order that the selected image or the specified image of the both images superposed each other by the image display means is transformed to the original shape, the image shape being the shape of the other image of the both images or the both images, and the image display means has an image presenting means for presenting selectable images other than the original one and a display image changing means for changing the displayed images by displaying both images transformed by the image transforming means.

23. A pseudo 3-D space representation system for representing a pseudo 3-D space with a plurality of 2-D images, comprising:

a specified area associating means for associating one or more sets of areas specified on one image and the other image or images as common parts;

an image transforming means for transforming one or both images through affine transformation by matching the corresponding areas specified on the images;

an image display means for displaying both images as superposed on each other;

an operation image display means for displaying a plurality of images; and an area specifying means for allowing a user to specify areas on each of two or more images displayed to the user;

wherein the image display means has an area presenting means for selectively presenting an area on an image associated with an area on another image and a display image changing means for changing display image by displaying the associated original image of the another image when the area presented by the area presenting means is selected.

24. A pseudo 3-D space representation system for representing a pseudo 3-D space with a plurality of 2-D images, comprising:

a specified area transforming means for transforming an area specified on an image through affine transformation;

a specified area retrieving means for retrieving a part common with the specified area from plural images;

an image transforming means for transforming one or both images through affine transformation in such a way that the specified area and the retrieved area may matched with each other; and an image display means for displaying both images superposed on each other;

an operation image display means for displaying an image; and an area specifying means for specifying an area on the displayed image;

wherein the image display means has an area presenting means for selectively presenting an area on an image associated with an area on another image and a display image changing means for changing display image by displaying the associated original image of the another image when the area presented by the area presenting means is selected.

25. A pseudo 3-D space representation system for representing a pseudo 3-D space with a plurality of 2-D images, comprising:

a specified area associating means for associating one or more sets of areas specified on one image and the other image or images as common parts;

an image transforming means for transforming one or both images through affine transformation by matching the corresponding areas specified on the images;

an image display means for displaying both images as superposed on each other;

an operation image display means for displaying a plurality of images; and an area specifying means for allowing a user to specify areas on each of two or more images displayed to the user;

wherein an image is provided with metadata including at least information about a position and a direction thereof and there is provided a means for identifying a position of the image based an the each metadata and associating the metadata with the electronic map and a means for displaying the image identified by the metadata on the electronic map.

26. A pseudo 3-D space representation system for representing a pseudo 3-D space with a plurality of 2-D images, comprising:

a specified area transforming means for transforming an area specified on an image through affine transformation;

a specified area retrieving means for retrieving a part common with the specified area from plural images;

an image transforming means for transforming one or both images through affine transformation in such a way that the specified area and the retrieved area may matched with each other, an image display means for displaying both images superposed on each other;

an operation image display means for displaying an image; and an area specifying means for specifying an area on the displayed image;

wherein an image is provided with metadata including at least information about a position and a direction thereof and there is provided a means for identifying a position of the image based on the each metadata and associating the metadata with the electronic map and a means for displaying the image identified by the metadata on the electronic map.

27. A game system for playing a game for specifying an area on an image by using a pseudo 3-D space representation system for representing a pseudo 3-D space with a plurality of 2-D images, comprising:

a pseudo 3-D space representation system for representing a pseudo 3-D space with a plurality of 2-D images, comprising:

a specified area associating means for associating one or more sets of areas specified on one image and the other image or images as common parts;

an image transforming means for transforming one or both images through affine transformation by matching the corresponding areas specified on the images;

an image display means for displaying both images as superposed on each other, an operation image display means for displaying a plurality of images; and an area specifying means for allowing a user to specify areas on each of two or more images displayed to the user;

such that further specifying an area of another image associated with the specified area and repeating the same until all specified images are linked, which has an image database storing a plurality of image groups each composed of a plurality of images associated with each other in such a way that areas of images can be linked only in a specified order and which presents a group of images for users to specify areas one on each of two images, links two specified areas, adds points of the links and presents remaining images of the group excepting two images which areas were specified and repeats the same steps.

28. A game system for playing a game for specifying an area on an image by using a pseudo 3-D space representation system for representing a pseudo 3-D space with a plurality of 2-D images, comprising:

a pseudo 3-D space representation system for representing a pseudo 3-D space with a plurality of 2-D images, comprising:

a specified area transforming means for transforming an area specified on an image through affine transformation;

a specified area retrieving means for retrieving a part common with the specified area from plural images;

an image transforming means for transforming one or both images through affine transformation in such a way that the specified area and the retrieved area may matched with each other;

an image display means for displaying both images superposed on each other;

an operation image display means for displaying an image; and an area specifying means for specifying an area on the displayed image;

such that further specifying an area of another image associated with the specified area and repeating the same until all specified images are linked, which has an image database storing a plurality of image groups each composed of a plurality of images associated with each other in such a way that areas of images can be linked only in a specified order and which presents a group of images for users to specify areas one on each of two images, links two specified areas, adds points of the links and presents remaining images of the group excepting two images which areas were specified and repeats the same steps.

29. An electronic map display system, comprising a pseudo 3-D space representation system for representing a pseudo 3-D space with a plurality of 2-D images, said pseudo 3-D space representation system comprising:

a specified area associating means for associating one or more sets of areas specified on one image and the other image or images as common parts;

an image transforming means for transforming one or both images through affine transformation by matching the corresponding areas specified on the images;

an image display means for displaying both images as superposed on each other;

an operation image display means for displaying a plurality of images; and an area specifying means for allowing a user to specify areas on each of two or more images displayed to the user;

wherein said pseudo 3-D space representation system is embedded in a corresponding position on an electronic map or is linked thereto and displayed thereon.

30. An electronic map display system, comprising a pseudo 3-D space representation system for representing a pseudo 3-D space with a plurality of 2-D images, said pseudo 3-D space representation system comprising:

a specified area transforming means for transforming an area specified on an image through affine transformation;

a specified area retrieving means for retrieving a part common with the specified area from plural images;

an image transforming means for transforming one or both images through affine transformation in such a way that the specified area and the retrieved area may marched with each other;

an image display means for displaying both images superposed on each other;

an operation image display means for displaying an image; and an area specifying means for specifying an area on the displayed image;

wherein said pseudo 3-D space representation system is embedded in a corresponding position on an electronic map or is linked thereto and displayed thereon.

31. An electronic map providing system comprising a server device having an electronic map database containing a pseudo 3-D spatial electronic map prepared by embedding in corresponding positions thereof or linked thereto pseudo 3-D space representation images created by using a pseudo 3-D space representation system for representing a pseudo 3-D space with a plurality of 2-D images, said 3-D space representation system comprising:

a specified area associating means for associating one or more sets of areas specified on one image and the other image or images as common parts;

an image transforming means for transforming one or both images through affine transformation by matching the corresponding areas specified on the images;

an image display means for displaying both images as superposed on each other;

an operation image display means for displaying a plurality of images; and an area specifying means for allowing a user to specify areas on each of two or more images displayed to the user;

wherein the server device connected to a number of client devices through a network retrieves the pseudo 3-D special electronic map in the electronic map database in response to access from the client device and provides it to the client device.

32. An electronic map providing system comprising a server device having an electronic map database containing a pseudo 3-D spatial electronic map prepared by embedding in corresponding positions thereof or linked thereto pseudo 3-D) space representation images created by using a pseudo 3-D space representation system for representing a pseudo 3-D space with a plurality of 2-D images, said 3-D space representation system comprising:

a specified area transforming means for transforming an area specified on an image through affine transformation;
a specified area retrieving means for retrieving a part common with the specified area from plural images;
an image transforming means for transforming one or both images through affine transformation in such a way that the specified area and the retrieved area may matched with each other;
an image display means for displaying both images superposed on each other;
an operation image display means for displaying an image; and
an area specifying means for specifying an area on the displayed image;
wherein the server device connected to a number of client devices through a network retrieves the pseudo 3-D special electronic map in the electronic map database in response to access from the client device and provides it to the client device.

33. A navigation system comprising a server device comprising an electronic map database containing a pseudo 3-D spatial electronic map comprising a pseudo 3-D space representation system for representing a pseudo 3-D space with a plurality of 2-D images, said pseudo 3-D space representation comprising:
a specified area associating means for associating one or more sets of areas specified on one image and the other image or images as common parts;
an image transforming means for transforming one or both images through affine transformation by matching the corresponding areas specified on the images; and
an image display means for displaying both images as superposed on each other;
prepared by embedding in corresponding positions thereon or linked thereto a pseudo 3-D space representation image created by using said pseudo 3-D space representation system, wherein the server device is connected to a number of client devices capable of detecting its present position through network and, in response to an access from any client device indicating its current position, it retrieves in the electronic map database and provides the client device with pseudo 3-D spatial electronic map corresponding to the current position, thus navigating the user of the client device.

34. A navigation system comprising a server device comprising an electronic map database containing a pseudo 3-D spatial electronic map comprising a pseudo 3-D space representation system for representing a pseudo 3-D space with a plurality of 2-D images, said pseudo 3-D space representation comprising:
a specified area transforming means for transforming an area specified on an image through affine transformation;
a specified area retrieving means for retrieving a part common with the specified area from plural images;
an image transforming means for transforming one or both images through affine transformation in such a way that the specified area and the retrieved area may matched with each other;
an image display means for displaying both images superposed on each other;
an operation image display means for displaying an image; and
an area specifying means for specifying an area on the displayed image;
prepared by embedding in corresponding positions thereon or linked thereto a pseudo 3-D space representation image created by using said pseudo 3-D space representation system, wherein the server device is connected to a number of client devices capable of detecting its present position through network and, in response to an access from any client device indicating its current position, it retrieves in the electronic map database and provides the client device with pseudo 3-D spatial electronic map corresponding to the current position, thus navigating the user of the client device.

35. A navigation system comprising an electronic map database containing a pseudo 3-D spatial electronic map prepared by embedding in corresponding positions thereon or linked thereto a pseudo 3-D space representation image created by using a pseudo 3-D space representation system for representing a pseudo 3-D space with a plurality of 2-D images, said pseudo 3-D space representation system comprising:
a specified area associating means for associating one or more sets of areas specified on one image and the other image or images as common parts;
an image transforming means for transforming one or both images through affine transformation by matching the corresponding areas specified on the images;
an image display means for displaying both images as superposed on each other;
an operation image display means for displaying a plurality of images; and
an area specifying means for allowing a user to specify areas on each of two or more images displayed to the user;
such that said navigation system navigates a user by detecting a current position, searching an electronic map corresponding to the detected current position in the electronic database, and displaying the pseudo 3-D spatial electronic map on a display screen of the user device.

36. A navigation system comprising an electronic map database containing a pseudo 3-D spatial electronic map prepared by embedding in corresponding positions thereon or linked thereto a pseudo 3-D space representation image created by using a pseudo 3-D space representation system for representing a pseudo 3-D space with a plurality of 2-D images, said pseudo 3-D space representation system comprising:
a specified area transforming means for transforming an area specified on an image through affine transformation;
a specified area retrieving means for retrieving a part common with the specified area from plural images;
an image transforming means for transforming one or both images through affine transformation in such a way that the specified area and the retrieved area may matched with each other;
an image display means for displaying both images superposed on each other;
an operation image display means for displaying an image; and
an area specifying means for specifying an area on the displayed image;
such that said navigation system navigates a user by detecting a current position, searching an electronic map corresponding to the detected current position in the electronic database, and displaying the pseudo 3-D spatial electronic map on a display screen of the user device.

37. Pseudo 3-D space representation system as defined in any one of claims 15, 16, 21, and 22, wherein the image transforming means has an interpolation image generating means for generating a series of interpolating images by affine transformation until a next original image is displayed, and the display image changing means has an interpolation image display means for subsequently displaying the interpolation images generated by the interpolation image generating means.

38. Pseudo 3-D space representation system as defined in claim 37, further comprising a traversing time changing means for changing a traversing time necessary for changing a display image from an unchanged image to an original image, to represent a pseudo temporal distance according to a difference between the unchanged image and the original image.

39. Pseudo 3-D representation system as defined in claim 37, wherein each image is provided with metadata including at least time information, and a calculation means is provided for calculating a time necessary for changing a display from an original image to another image, and the changing is completed within a calculated time.

40. Pseudo 3-D space representation system as defined in claim 37, wherein each image is provided with metadata including at least information about a position and a direction thereof, a calculation means is provided for calculating relative positions for each of two images according to the metadata, and changing a display from an original image to another image is completed according to a specified relationship between two positions.

41. Pseudo 3-D space representation system as defined in any one of claims 3, 4, 23, and 24, wherein the image transforming means has an interpolation image generating means for generating a series of interpolating images by affine transformation until a next original image is displayed, and the display image changing means has an interpolation image display means for subsequently displaying the interpolation images generated by the interpolation image generating means.

42. Pseudo 3-D space representation system as defined in claim 41, further comprising a traversing time changing means for changing a traversing time necessary for changing a display image from an unchanged image to an original image, to represent a pseudo temporal distance according to a difference between the unchanged image and the original image.

43. Pseudo 3-D space representation system as defined in claim 41, wherein each image is provided with metadata including at least time information, and a calculation means is provided for calculating a time necessary for changing a display from an original image to another image, and the changing is completed within a calculated time.

44. Pseudo 3-D space representation system as defined in claim 41, wherein each image is provided with metadata including at least information about a position and a direction thereof, a calculation means is provided for calculating relative positions for each of two images according to the metadata, and changing a display from an original image to another image is completed according to a specified relationship between two positions.

45. Program for operating a computer as a game system, utilizing a pseudo 3-D space representation system as defined in any one of claims 7, 8, 27, and 28.

46. Program for operating a computer as an electronic map display system, utilizing a pseudo 3-D space representation system as defined in any one of claims 9, 10, 29, and 30.

47. Program for operating a computer as an electronic map providing system, utilizing a pseudo 3-D space representation system as defined in any one of claims 11, 12, 31, and 32.

48. Program for operating a computer as a navigation system, utilizing a pseudo 3-D space representation system as defined in any one of claims 13, 14, 33, and 34.

49. Program for operating a computer as a navigation system, utilizing a pseudo 3-D space representation system as defined in any one of claims 15, 16, 35, and 36.

50. Program for operating a computer to execute an electronic map providing method, as defined in any one of claims 17 and 18.

51. Program for operating a computer to execute a navigation method, as defined in any one of claims 19 and 20.

* * * * *